US007778732B2

(12) United States Patent
Adachi et al.

(10) Patent No.: US 7,778,732 B2
(45) Date of Patent: Aug. 17, 2010

(54) ROBOT APPARATUS PERFORMING SHIELDING OPERATION OF AN OBJECT FROM WORKSPACE

(75) Inventors: Yuji Adachi, Osaka (JP); Yasunao Okazaki, Shiga (JP); Katsuhiko Asai, Nara (JP); Kazuo Yokoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/356,719

(22) Filed: Jan. 21, 2009

(65) Prior Publication Data

US 2009/0125145 A1 May 14, 2009

Related U.S. Application Data

(60) Division of application No. 11/783,582, filed on Apr. 10, 2007, now Pat. No. 7,539,558, which is a continuation of application No. PCT/JP2005/017738, filed on Sep. 27, 2005.

(30) Foreign Application Priority Data

Oct. 19, 2004 (JP) ............................. 2004-304161

(51) Int. Cl.
*G06F 19/00* (2006.01)
(52) U.S. Cl. ..................... 700/245; 700/250; 901/3; 318/568.12
(58) Field of Classification Search ............... 700/250; 901/3; 318/568.12
See application file for complete search history.

(56) References Cited

U.S. PATENT DOCUMENTS

| 5,049,028 A | 9/1991 | Asano et al. |
|---|---|---|
| 5,165,841 A | 11/1992 | Asano et al. |
| 5,307,447 A | 4/1994 | Asano et al. |
| 5,956,465 A * | 9/1999 | Takagi et al. ................. 700/255 |
| 6,166,371 A * | 12/2000 | Milbrath et al. ............. 250/221 |
| 6,376,939 B1* | 4/2002 | Suzuki et al. ............... 307/326 |
| 6,678,583 B2* | 1/2004 | Nasr et al. ................... 700/245 |
| 6,708,956 B1* | 3/2004 | Mangelsen et al. ............ 256/24 |
| 2003/0076224 A1 | 4/2003 | Braune |
| 2006/0038688 A1* | 2/2006 | Nakamura ............... 340/573.1 |

FOREIGN PATENT DOCUMENTS

JP 59-102595 6/1984

(Continued)

OTHER PUBLICATIONS

International Search Report (in English language) issued Jan. 10, 2006 in International Application No. PCT/JP2005/017738.

*Primary Examiner*—Thomas G Black
*Assistant Examiner*—Sze-Hon Kong
(74) *Attorney, Agent, or Firm*—Wenderoth, Lind & Ponack, L.L.P.

(57) ABSTRACT

A working robot arm and an object recognizing unit used for recognizing a moving body such as a person and an animal are prepared, and while an object recognized by the object recognizing unit is blocked by a shielding operation by the use of the robot arm or a trunk portion of a robot mechanism unit, a job is carried out by the working robot arm so that it becomes possible to actively ensure a working space of the robot mechanism unit, and consequently to continue the job safely.

10 Claims, 23 Drawing Sheets

FOREIGN PATENT DOCUMENTS

| | | | |
|---|---|---|---|
| JP | 1-199779 | | 8/1989 |
| JP | 9-185412 | | 7/1997 |
| JP | 9-272096 | | 10/1997 |
| JP | 10000255 A | * | 1/1998 |
| JP | 2000-263489 | * | 9/2000 |
| JP | 2001-273032 | | 10/2001 |
| JP | 2002-233277 | | 8/2002 |
| JP | 2002-283277 | * | 10/2002 |
| JP | 2002-319041 | | 10/2002 |
| JP | 2003-89091 | | 3/2003 |
| JP | 2003-222295 | * | 8/2003 |
| JP | 2005-59160 | | 3/2005 |

* cited by examiner

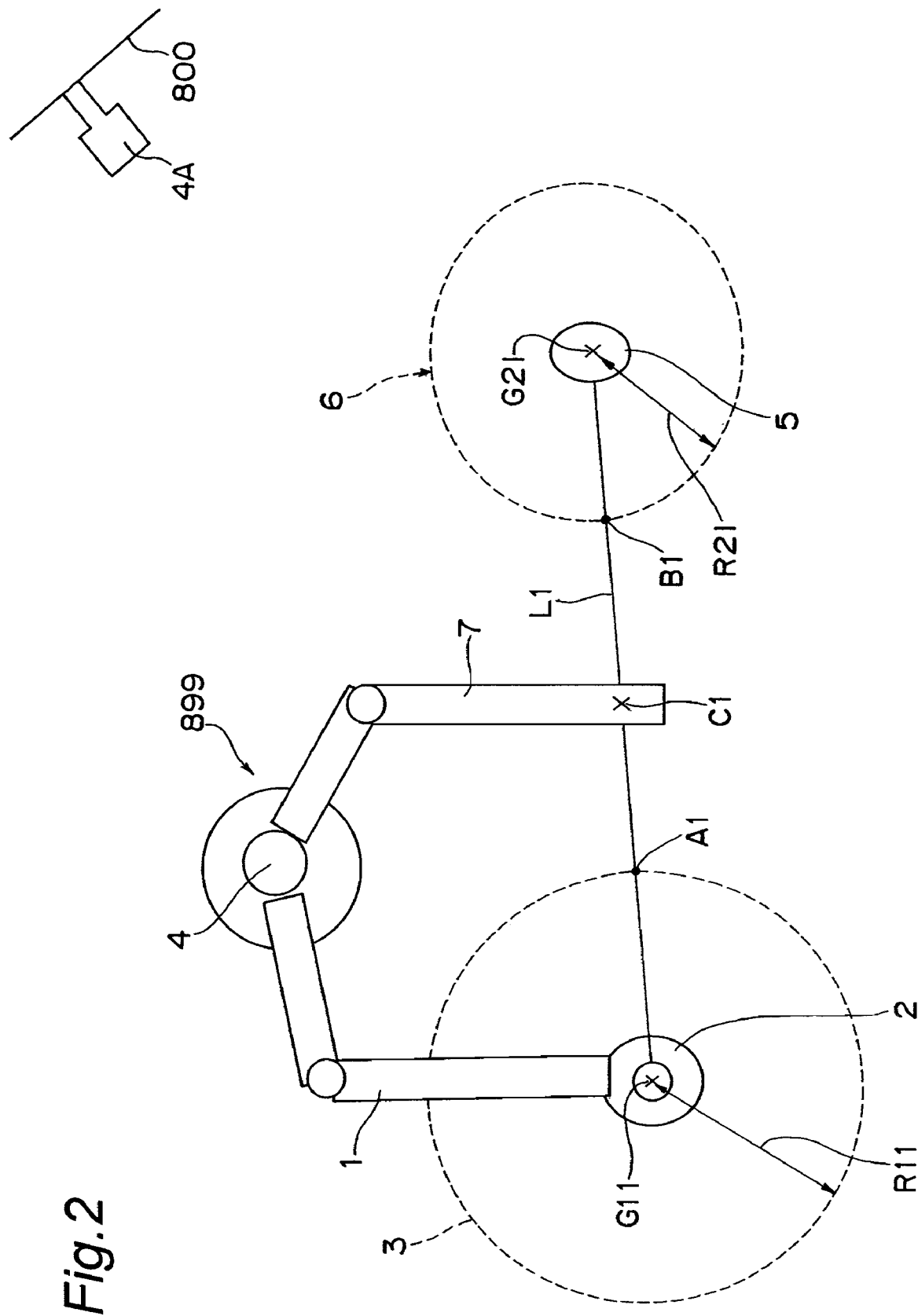

Fig.5A

|  |  | WORK SUBJECT | |
|---|---|---|---|
|  |  | HOT PAN | COLD PAN |
| OBJECT TO BE RECOGNIZED | ADULT | 150 | 100 |
|  | CHILD | 200 | 130 |

Fig.5B

|  |  | WEIGHT | |
|---|---|---|---|
|  |  | HEAVY | LIGHT |
| HARDNESS | SOFT | 150 | 100 |
|  | HARD | 200 | 120 |

Fig.6E

| STEP | JOB | CONTINUITY |
|---|---|---|
| START | | |
| S1 | PREPARE FOOD MATERIALS | × |
| S2 | HEAT FOOD MATERIALS | ○ |
| S3 | DISH UP | × |
| COMPLETION | | |

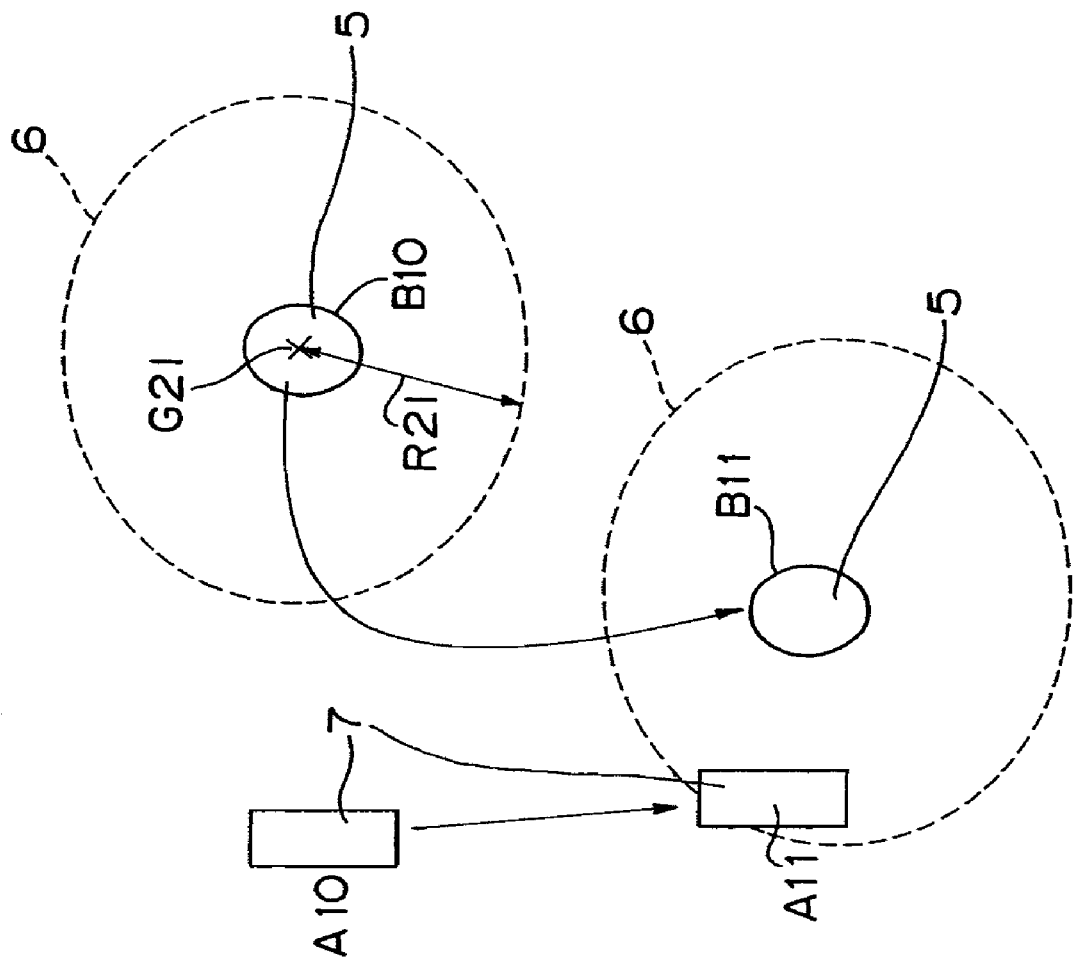
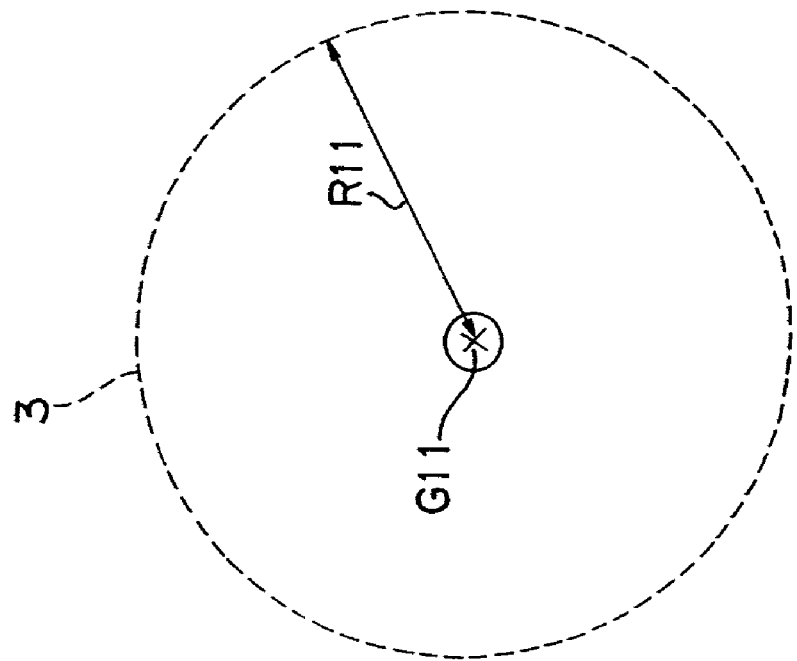
Fig. 11

ROBOT APPARATUS PERFORMING SHIELDING OPERATION OF AN OBJECT FROM WORKSPACE

This is a divisional application of Ser. No. 11/783,582, filed Apr. 10, 2007, now U.S. Pat. No. 7,539,558 which is a continuation application of International Application No. PCT/JP2005/017738, filed Sep. 27, 2005.

BACKGROUND OF THE INVENTION

The present invention relates to a robot apparatus that coexists with a person and carries out a job in a human life space that is typically represented by a home.

Conventionally, with respect to a safe working method of a robot, most of the systems have a structure in which the entire working space of a robot is completely covered with a cover so that a person and a robot are completely separated from each other so as not to coexist with each other. With respect to the system that permits the coexistence of a person and a working robot, the following prior art apparatuses have been proposed in the industrial robot field (for example, see Japanese Unexamined Patent Publication No. 59-102595, Japanese Unexamined Patent Publication No. 2003-89091, Japanese Unexamined Patent Publication No. 9-185412, and Japanese Unexamined Patent Publication No. 2002-283277.

FIG. 19 shows a conventional robot safety device disclosed in JP 59-102595. In FIG. 19, a safety mat 102 is placed on the periphery of an industrial robot 101. When an operator comes close to the industrial robot 101 to give teaching, an electrode switch of the safety mat 102 is turned ON by the weight of the operator so that an approach of the operator is detected, and the approach of a person is informed to a control apparatus 104 through a cable 103. Upon detection of the approach, the control apparatus 104 slows down the operation speed track to suppress an impact upon contact with the arm of the robot 101 so that a safe teaching operation is achieved.

FIG. 20 shows a conventional robot control device having a touch sensor disclosed in the above-mentioned JP 2003-89091.

In FIG. 20, a robot 111 of a multi-joint arm type is provided with a plurality of touch sensors 113 in its arm portion 112. The robot 111 has a plurality of joints, and depending on jobs, the joints are generally classified into those joints that are directly related to a job and those joints that are not directly related to the job. In the robot 111, with respect to the joint that is not directly related to the job, a weighting process is applied thereto so that, upon detection of a contact by the touch sensor (contact sensor) 113, a departing and avoiding action from the contact portion is conducted, while, with respect to the joint that is directly related to the job, a weighting process is applied thereto so as to give priority to carry out the job. Thus, by providing such a motion component as to depart from the contact portion as a whole, a job that is executed while carrying out an avoiding action is achieved. Here, in FIG. 20, reference numeral 110 represents a visual system, 133 represents a contact control device, 134 represents a job instruction unit, 135 represents a job control device, 136 represents an operation selecting device, 137 represents an operation conversion device, and 138 represents a linear relationship generating device.

FIG. 21 is a block diagram that shows a conventional autonomous moving device described in JP 9-185412.

In FIG. 21, an autonomous moving robot 121 is provided with ultrasonic sensors 122 used for detecting an obstacle in the traveling direction and infrared-ray sensors 123 used for detecting infrared rays radiated from the person. The autonomous moving robot 121 has achieved the following operation: Upon detection of an obstacle by the obstacle sensor 121, it determines whether or not the obstacle is a person by using the infrared-ray sensor 123, and in the case of a person, when, after a predetermined period of stand-by operation, the person does not leave the place, an avoiding operation is carried out. In the case of an obstacle other than a person, it immediately executes an obstacle avoiding operation, and is allowed to move.

Moreover, FIGS. 22A and 22B show a conventional robot safety device described in JP 2002-283277. In FIGS. 22A and 22B, a robot is positioned on the right side 156R of a robot safety device 156. Upon operating the robot, a person pushes a switch 160 so that, as shown in FIG. 22A, a shielding plate 152 on the person side 156L is raised, while a shielding plate 158 on the robot side 156R is lowered. However, when, upon manually exchanging a work 153, a person pushes the switch 160, the shielding plate 158 on the robot side 156R is raised, while the shielding plate 152 on the person side 156L is lowered, as shown in FIG. 22B. In this manner, when the switch 160 is pushed by a person, the shielding plate 158 on the robot side 156R is raised, with the result that the robot is no longer allowed to carry out a job on the work 153 by the shielding plate 158; thus, the job on the work 153 is stopped.

With respect to the robot operation in a specific place typically represented by a factory, such an environment generally allows a robot working space and a human action space to be separable from each other, and a safe operation is easily achieved by completely isolating the robot working space from the human action space by using a cover. Even in the case when portions of the robot working space and the human action space have to be shared, the devices disclosed in JP 59-102595, JP 2003-89091, and JP 9-185412 can be applied so that a safe operation is sufficiently achieved.

However, in a human life environment, typically represented by a home, it is usually difficult to completely separate the life environment into two, that is, the robot working space and the human action space, by using a cover. For example, supposing that a household-choirs assisting operation of a robot in a home, the most portions of the robot working space and the human action space are shared. For this reason, it is difficult to carry out the operation safely by applying the above-mentioned prior art devices disclosed in JP 59-102595, JP 2003-89091, and JP 9-185412, as they are, thereto. The following description will discuss the reasons thereof individually, by typically exemplifying a home.

JP 59-102595 is only effective basically at the time of a teaching instruction-giving operation. It is designed on the assumption that during a normal operation, the robot working space and the human action space are not shared, and a high-speed operation is carried out. The system is designed so that entering of a person into the robot working space is detected by a sensor and the robot is stopped immediately.

However, in the home environment in which most of the robot working space and the human action space are shared, the human action space and the robot working space frequently overlap with each other due to the movement of a person and the movement of a robot. For this reason, when JP 59-102595, as it is, is applied, there is a drawback in that the operation tends to experience failure due to frequent occurrences of a reduction in the operation efficiency due to a low-speed operation and a suspended operation due to a stoppage.

In JP 2003-89091, the contact portion with a person is detected by a contact sensor on the robot arm portion. Based upon the input of the contact sensor, command values are allocated to the respective joints of a robot so that a motion component is prepared so as to depart from the contact portion as the entire robot; thus, the operation is achieved while the contact-avoiding operation is being carried out.

However, in the home environment in which most of the robot working space and the human action space are shared, even when JP 2003-89091, as it is, is applied, upon contact with a person, the robot side only passively takes an avoiding action, with the result that the robot always escapes from the human contact; consequently, it can be said that this system fails to take into consideration that the working space is ensured to accurately carry out an operation. For this reason, although a safe operation with respect to the contact can be achieved to a certain degree, there is a drawback in that the robot operation efficiency for household-choirs assistances or the like is lowered.

In JP 9-185412, upon detection of a person, the autonomous moving device carries out a stand-by process or moves so as to avoid the person.

However, in the home environment in which the most of the robot working space and the human action space are shared, even when JP 9-185412, as it is, is applied, the robot always only passively takes an avoiding action to the person, resulting in an issue in that only the passive action fails to provide a sufficient operation efficiency in the moving operation.

In JP 2002-283277, when, upon placing a work 153, a person pushes the switch 160, the shielding plate 152 (green) on the person side 156L is lowered, while the shielding plate 158 on the robot side 156R is raised, so that the person is allowed to carry out a job of placing the work 153, with the robot operation to the work 153 being stopped. Consequently, even in the event of any failure in the robot, the presence of the shielding plate 158 on the robot side 156R prevents the person from contacting with the robot.

However, in an operation in the home environment in which the most of portions of the robot working space and the human action space are shared, the operation which is carried out with a large shielded space greatly limits the person's action, failing to provide a practical system.

In order to solve the above-mentioned issues of the conventional art, the object of the present invention is to provide a robot apparatus which, even in an environment in which the most of portions of the working space of the robot mechanism unit and the human action space are shared, typically represented by a home, achieves a safe robot operation while ensuring a sufficient operation efficiency.

SUMMARY OF THE INVENTION

In order to achieve the above-mentioned object, the present invention has the following arrangements.

According to a first aspect of the present invention, there is provided a robot apparatus comprising:

a robot mechanism unit having a robot arm and a robot main body to which the robot arm is attached;

an object recognizing unit for recognizing any one or a plurality of objects among three types of objects of a moving object, an animal, and a person; and a control unit for controlling the robot mechanism unit so as to carry out a work operation by using the robot arm of the robot mechanism unit, while shielding the object recognized by the object recognizing unit from entering a working space of the robot mechanism unit, by allowing one portion of the robot mechanism unit to carry out a shielding operation, wherein the control unit controls the robot mechanism unit so as to carry out the shielding operation by changing a position at which the shielding operation is carried out and kinds of the shielding operations, in response to a relative positional relationship between the object recognized by the object recognizing unit and the working space of the robot mechanism unit.

According to a second aspect of the present invention, there is provided a robot apparatus comprising:

a robot mechanism unit having a robot arm, a robot main body to which the robot arm is attached, and a moving mechanism for moving the robot main body;

an object recognizing unit for recognizing any one or a plurality of objects among three types of objects of a moving object, an animal, and a person; and a control unit for controlling the robot mechanism unit so as to carry out a work operation by using the robot arm of the robot mechanism unit, a work operation by using the moving mechanism, or a cooperative work operation between the robot arm and the moving mechanism, while shielding the object recognized by the object recognizing unit from entering a working space of the robot mechanism unit by allowing one portion of the robot mechanism unit to carry out a shielding operation.

In the present structure, a person is recognized by the object recognizing unit, and, for example, when it has been recognized that the working space of the robot mechanism unit overlaps with the human action space, a shielding operation against the person is carried out by using one portion of the robot mechanism unit so that it becomes possible to, not passively but actively, prevent the working space of the robot mechanism unit and the human action space from overlapping with each other, if necessary, and consequently to carry out a safe operation while ensuring the working space of the robot mechanism unit.

In accordance with the robot apparatus of the present invention, without the necessity of using a member exclusively used for completely shielding the working space of the robot mechanism unit from the human action space, typically represented by a safety cover for an industrial robot, one portion of the robot mechanism unit is used for shielding a person, if necessary, so as to actively ensure the working space of the robot mechanism unit; therefore, in an environment, such as a home, in which a robot apparatus and a person coexist, the robot apparatus is allowed to carry out a safe operation, while ensuring the working space of the robot mechanism unit.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is an explanatory view that explains a shielding operation determined based upon a relationship between a person and the working space of the robot mechanism unit in the robot apparatus in accordance with the first embodiment of the present invention;

FIG. 5A is a view that shows a table for explaining a control method of a shielding operation based upon a degree of danger in a robot apparatus in accordance with another modified example of the first embodiment of the present invention;

FIG. 5B is a view that shows a table which explains a control method in which, by setting a degree of danger based upon physical properties such as the size, weight, and the like of a work subject of the robot, a shielding operation is controlled based on the degree of danger, in a robot apparatus in accordance with still another modified example of the first embodiment of the present invention;

FIG. 6E is an explanatory view that shows a database in a modified example of the shielding operation of the robot apparatus in accordance with the first embodiment of the present invention;

FIG. 11 is an explanatory view for explaining a shielding operation in a robot apparatus in still another modified example of the first embodiment of the present invention;

DETAILED DESCRIPTION OF THE PREFERRED EMBODIMENTS

Figure 1A:
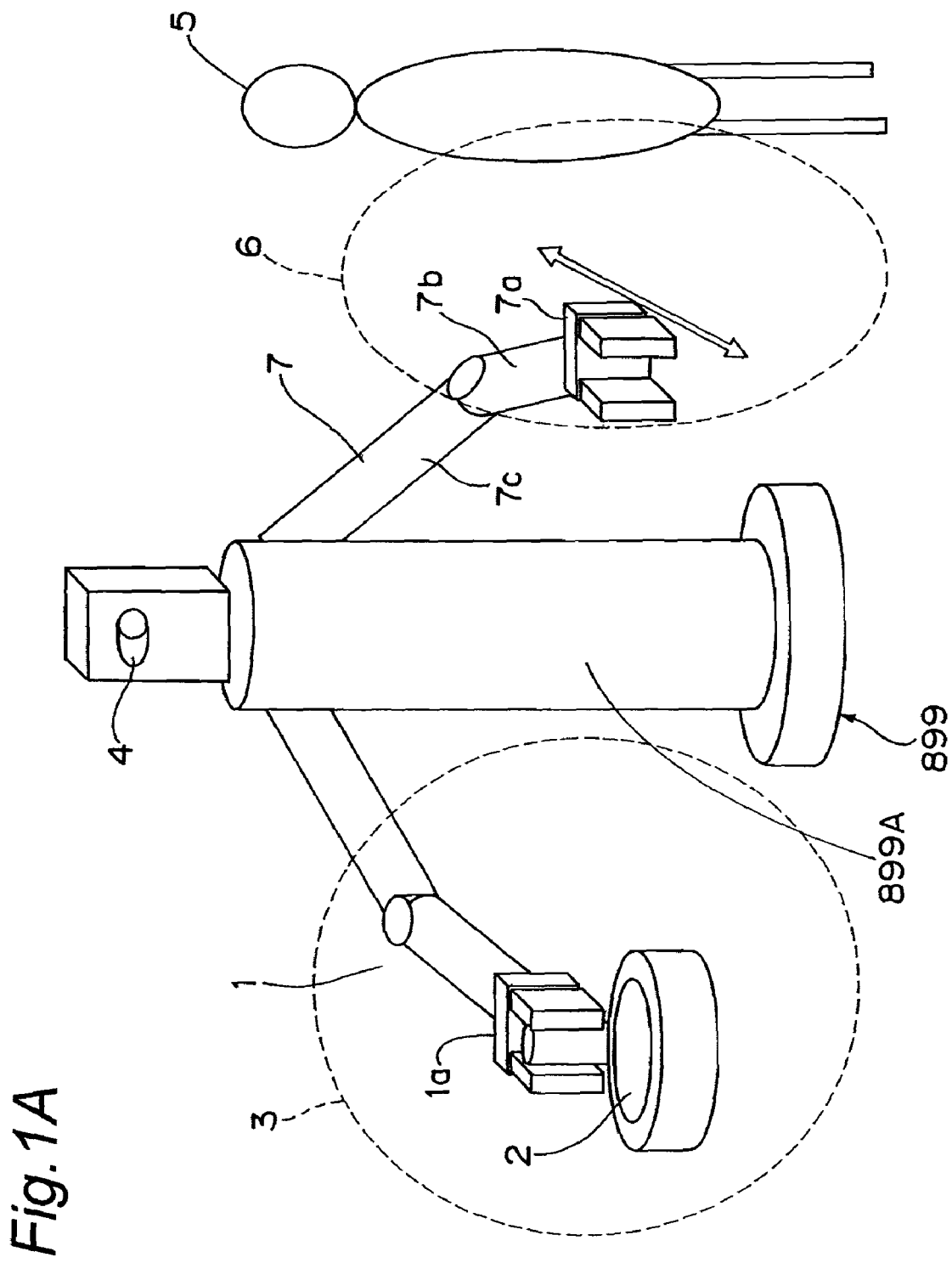
FIG. 1A is a schematic view that shows a work operation and a shielding operation of a robot apparatus in accordance with a first embodiment of the present invention.

Before the description of the present invention proceeds, it is to be noted that like parts are designated by like reference numerals throughout the accompanying drawings.

Referring to drawings, the following description will discuss the embodiments of the present invention.

First Embodiment

Figure 1B:
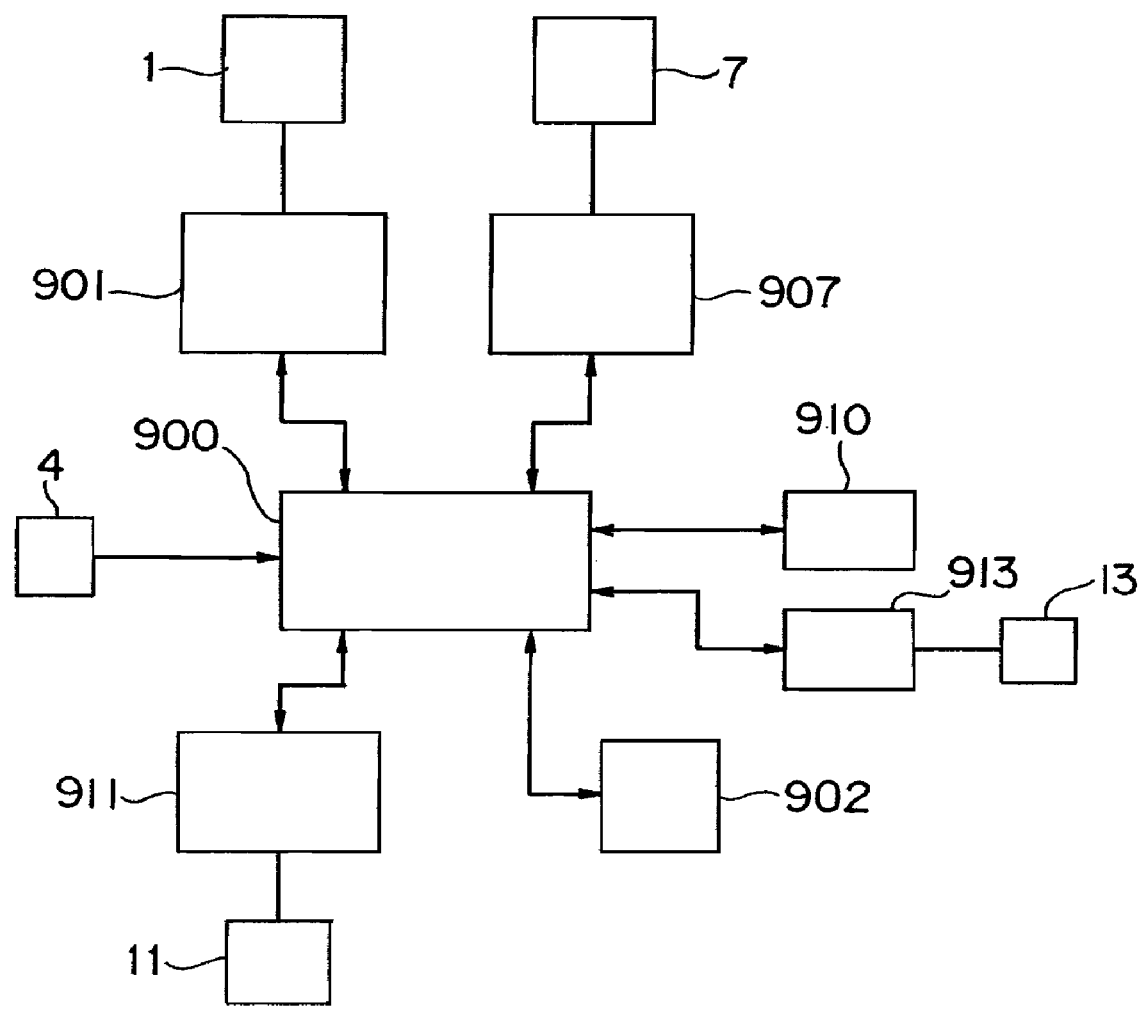
FIG. 1B is a block diagram that shows the robot apparatus in accordance with the first embodiment of the present invention.

FIG. 1A and FIG. 1B are a schematic view of work and a block diagram of a robot apparatus in accordance with a first embodiment of the present invention.

In FIG. 1A and FIG. 1B, a robot arm, which carries out the work of the robot apparatus, is defined as a working robot arm 1. The robot apparatus is provided with: a robot mechanism unit 899 which is provided with a robot main body 899A having the working robot arm (first robot arm) 1, and a second robot arm 7 that is different from the first robot arm 1; a first robot arm driving unit 901 for driving the working robot arm 1; a second robot arm driving unit 907 for driving the second robot arm 7; a moving mechanism driving unit 911 that is installed in the robot mechanism unit 899, for driving a moving mechanism 11 used for moving the robot main body 899A; an object recognizing unit 4 for recognizing either one or two or more of the objects among three types of objects of a moving body, an animal, and a person; and a control unit 900 to which results of recognition in the object recognizing unit 4 are inputted, for operation-controlling the first robot arm driving unit 901, the second robot arm driving unit 907, and the moving mechanism driving unit 911 respectively in an independent manner. Here, reference numeral 902 indicates a database which is connected to the control unit 900, for storing operation programs used for driving the first robot arm driving unit 901, the second robot arm driving unit 907, and the moving mechanism driving unit 911 respectively in an independent manner; as well as storing driving information among the first robot arm driving unit 901, the second robot arm driving unit 907, and the moving mechanism driving unit 911; recognized information in the object recognizing unit 4; and the like.

The working robot arm 1 carries out a job on a work object 2 when driven by the first robot arm driving unit 901 through the control unit 900. For explanation, the following description will be carried out as one example of a job of the robot apparatus in which a frying pan 2 is taken as one example of a work object 2, and a household-choirs assisting job is carried out while the frying pan 2 held by the working robot arm 1 is shaken. For example, when the robot apparatus makes pan-fried vegetables by using the frying pan 2, the working robot arm 1 holding the frying pan 2 by a hand 1a at its tip is driven to shake by the first robot arm driving unit 901; thus, the frying pan 2 is shaken longitudinally as well as laterally so that the mixing and pan-frying effects for the inner materials can be obtained. In this manner, the working robot arm 1 and the frying pan 2 are moved and operated within a predetermined longitudinal and lateral range so that an area required for the job forms a working space 3 (hereinafter, referred to simply as "robot working space") of the robot mechanism unit 899, indicated by a dotted line.

The robot working space 3 is changed in its size and shape basically depending on the contents of the job of the robot mechanism unit 899. Basically, the robot working space 3 represents a space in which the robot mechanism unit 899 is allowed to move to carry out a job, and a spatial weighting process may be carried out based upon the orientation of the robot mechanism unit 899 and the position, speed, angular velocity, moment of inertia, parameters inherent to the job, etc. of the robot arm 1 or the like. For example, the spatial weights may be determined based upon the finger-tip speed that is achieved by using a joint speed referred to as a degree of operability.

Figure 1C:
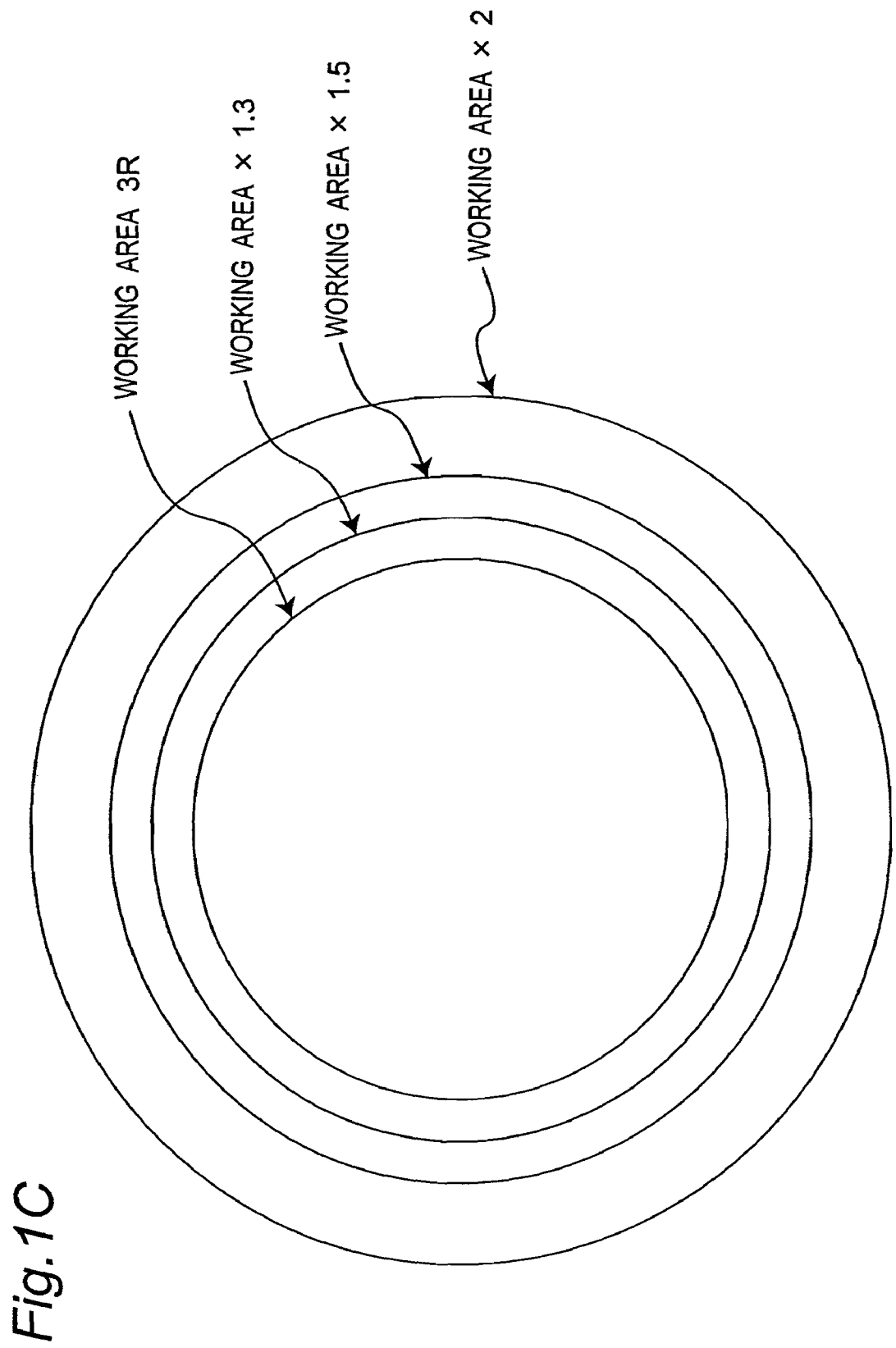
FIG. 1C is an explanatory view in a case where an area, prepared by multiplying the working area of the robot by a safety rate of each of 1.3 times, 1.5 times, and 2 times, is used as a working space of a robot mechanism unit, in the robot apparatus in accordance with the first embodiment of the present invention.

For a specific example, the area (working range) in which the robot arm 1 and the frying pan 2 move so as to carry out a job at a certain point of time may be defined as a robot working space 3, or within the range (working range) in which the robot arm 1 is allowed to move, the entire range (working range) in which the robot arm 1 and the frying pan 2 are allowed to move may be defined as the robot working space 3. Moreover, in the case where the robot mechanism unit 899 has a speed in a certain direction, the range (working range) which can be reached by the robot mechanism unit 899 after a lapse of specified time (for example, one second) from a certain point of time may be defined as the robot working space 3. Moreover, as shown in FIG. 1C, a range determined by multiplying the working range 3R by a safety rate (for example, 1.3 times, 1.5 times, 2 times) may be defined as the robot working space 3.

For one example of the method for determining the safety rate, one method is proposed in which the safety rate is determined by utilizing kinetic energy of the robot arm 1 and the work object (for example, frying pan) in the robot working space 3. In other words, since the impact upon contact with the robot arm 1 is high when the moving speed of the robot arm 1 is high, for example, the kinetic energy at the time when the robot arm 1 is moving at a certain low speed is defined as a reference value, and when the value of kinetic energy is equal to or below the reference value, the safety rate is set to 1, while the value thereof exceeds the reference value, the ratio of the value of kinetic energy to the reference value, as it is, is used as the safety rate.

Here, the job in which the frying pan 2 held by the robot arm is shaken has been exemplified as the robot job; however, any desired operation may be used as long as the job is carried out by using the working robot arm 1. Moreover, the working robot arm 1 may be designed as any type of a vertical multi-joint type, a horizontal multi-joint type, and a parallel link type. Moreover, an end effector may be attached to the tip of the working robot arm 1 as the hand 1a, and its mechanism may be a suction type or a mechanical hand, or may be made exchangeable depending on the job.

Moreover, as described earlier, the robot apparatus is provided with an object recognizing unit 4 for recognizing either one or two or more of the objects among three types of objects of a moving body, an animal, and a person. The moving body mentioned here refers to a physical object accompanied by a motion, such as a closing or opening door, a ball, and a car. For explanation, the following description will take a person 5 as an object to be recognized.

Here, with respect to the object recognizing unit 4, a device using image-pickup elements such as a CCD camera or an infrared camera may be used, or a person, an animal, or a moving body may be measured by conducting an image processing. Moreover, in the object recognizing unit 4, recognition may be made by using a distance measuring sensor in which a laser range finder or infrared rays are used. Furthermore, with respect to the object recognizing unit 4, a sensor, such as a force sensor and a photoelectric sensor, may be used, or recognition may be made by using not only one kind of sensor, but also a plurality of sensors in combination. The object recognizing unit 4 may be installed in one portion of the robot mechanism unit 899 as shown in FIGS. 1A and 1B, or may be attached to a ceiling 800 or the like above the room in which the robot mechanism unit 899 is placed, and information from the sensor 4A (see FIG. 2) serving as the object recognizing unit 4 may be given to the control unit 900 of the robot mechanism unit 899 through wireless or wire communication.

The space in which the object to be recognized 2 moves is defined as an action space 6. When the object to be recognized 2 is set to a person 5, the action space 6 (hereinafter, referred to simply as "human action space") of the person 5 is formed. For example, the human action space 6 may be defined based upon a range in which the person 5 can move during a unit time obtained from the speed of the person 5. More specifically, a range that can be reached by one portion of the body of the person 5 at a certain point of time may be defined as the human action space 6, or in the case where the person 5 has a speed in a certain direction, all the range that can be reached by the person 5 after a lapse of specified time (for example, one second) from a certain point of time may be defined as the human action space 6. Moreover, a range determined by multiplying the range by a safety rate (for example, 1.2 times) may be defined as the human action space 6.

In the case of the human action space 6 also, by using parameters such as the proceeding direction, position, speed, acceleration, moment of inertia, etc. of the person 5, the human action space 6 may be defined based upon the easiness and the like of the movement.

The robot mechanism unit 899 carries out, for example, a shaking operation of a frying pan 2 in a pan-fried-vegetable making job within the robot working space 3, and in such a case, there is the danger that the working robot arm 1 or the frying pan 2 might come into contact with the person 5. For this reason, in order to carry out the robot job while maintaining the safety of the person 5, it is necessary to prevent the robot working space 3 and the human action space 6 from spatially crossing each other. Therefore, the robot mechanism unit 899 carries out a shielding operation that shields the robot working space 3 and the human action space 6 from each other, while carrying out the job within the robot working space 3, under control by the control unit 900. Here, the first embodiment will discuss a case in which one portion of the robot mechanism unit 899 that carries out the shielding operation is supposed to be one portion of the robot mechanism unit 899 other than the working robot arm 1, and more specifically to be a robot arm 7. In other words, in the first embodiment, under the control of the control unit 900, the job is carried out by the working robot arm 1 within the robot working space 3 through the driving operation of the first robot arm driving unit 901, while the shielding operation for shielding the robot working space 3 and the human action space 6 from each other is carried out by the second robot arm 7 through the driving operation of the second robot arm driving unit 907.

With respect to the robot mechanism unit 899 other than the working robot arm 1, another mechanism or the like, which is different from a robot arm shape, such as carrying out the shielding operation by using a movable shielding plate attached to the robot mechanism unit 899, may be used, and any mechanism may be used as long as it exerts the effect of shielding the robot working space 3 and the human action space 6 from each other. Here, the shielding mechanism is not necessarily required to be directly attached to the main body of the robot mechanism unit 899, and the shielding mechanism may be attached to a wall or the ceiling of the room in which the robot mechanism unit 899 is placed so that the shielding mechanism is driven by the control of the control unit 900 in the robot mechanism unit 899 to carry out the shielding operation. In any case, in conventional robots and the like, upon shielding the person and the robot mechanism unit 899 from each other, a cover is simply used to shield the space during the job; in contrast, different from the system simply shielding the space, the first embodiment and another embodiment of the present invention are characterized in that the second robot arm driving unit 907 is driven under the control of the control unit 900 to move the robot arm 7 and the shielding mechanism so as to shield the robot working space 3 and the human action space 6 from each other, in response to the contents of the job and the position of the person 5, and operations for ensuring the job and safety within the robot working space 3 are carried out so that the job is continuously conducted.

Based upon the recognized information in the object recognizing unit 4, the information stored in the database 902, and the job to be carried out in the robot mechanism unit 899, the robot mechanism unit 899 drives the second robot arm driving unit 907 under the control of the control unit 900 to carry out the shielding operation by using the robot arm 7 so as to prevent the human action space 6 from coming close to the robot working space 3. The shielding operation of the robot arm 7 is carried out by waving the robot arm 7 in vertical directions or in lateral directions along crossing directions of the moving direction of the person 5 or the shortest straight line connecting the person 5 to the robot working space 3, or in forward and rearward directions with respect to the proceeding direction of the person 5, and the waving speed, waving width, or the like are preferably determined preliminarily based upon the recognized information in the object recognizing unit 4, the information stored in the database 902, the job to be carried out by the robot mechanism unit 899, and the like, and stored in the database 902. For example, preferably, a plurality of waving operations, such as, making the waving speed slow and the waving width small when the human action space 6 and the robot working space 3 are apart from each other with a long distance, and making the waving speed faster and the waving width bigger as the human action space 6 and the robot working space 3 come close to each other, are prepared, and in accordance with the distance between the human action space 6 and the robot working space 3, the control unit 900 may select an appropriate operation on demand.

More specifically, first, the robot mechanism unit 899 recognizes the human action space 6 of a person 5 by using the object recognizing unit 4, during an operation inside the robot working space 3, or prior to the operation inside the robot working space 3 as well as during the operation. The human action space 6 is not necessarily always stationary, and moves in response to the movement of the person 5.

For this reason, based upon the recognized information in the object recognizing unit 4, the second robot arm driving unit 907 is driven under the control of the control unit 900 to move the robot arm 7 in response to the movement of the person 5, so as to prevent the human action space 6 from coming close to the robot working space 3; thus, an operation (shielding operation) to shield to block the movement of the person is carried out. With respect to such a shielding operation, based upon the recognized information in the object recognizing unit 4, the second robot arm driving unit 907 is driven under the control of the control unit 900, with the robot mechanism unit 899 being positioned in the middle point of an area between the robot working space 3 and the human action space 6, so that the robot arm 7 (more specifically, a hand 7a and a first arm 7b at the tip of the robot arm 7) is positioned on the person-5-side, that is, the human action space-6-side, with respect to the border of the robot working space 3, and, as shown in FIG. 1A, the robot arm 7 (more specifically, the hand 7a, the first arm 7b, and the second arm 7c of the tip of the robot arm 7) is moved to wave along directions crossing the approaching direction of the person 5.

By using the above-mentioned arrangement, the proceeding person 5 can be blocked by the shielding operation of the robot arm 7 so that the human action space 6 is prevented from coming close to the robot working space 3.

Referring to FIGS. 2 to 5B, specific examples of the shielding operation will be explained.

In the first embodiment, the object to be recognized is supposed to be a person 5, and the shielding mechanism is supposed to be a robot arm 7.

FIGS. 2 to 5B are schematic views that show a system of the shielding operation, and each of them indicates a relative positional relationship between the robot working space 3 and the human action space 6 of the person 5. The relative positional relationship is shown because, when the robot mechanism unit 899 has a moving mechanism 11 as will be described later, the robot working space 3 itself of the robot mechanism unit 899 is allowed to move.

During the operation, the robot working space 3 and the human action space 6 need to be maintained so as not to cross each other.

(I) For a specific example of the shielding operation, as shown in FIG. 2, suppose that the robot working space 3 and the human action space 6 are respectively approximated as spheres.

First, in a room or a space in which the robot mechanism unit 899 is positioned, the coordinate position of the robot mechanism unit 899 and the coordinate position of the person 5 are recognized by the object recognizing unit 4 (moreover by using an object recognizing unit 4A, such as a camera, attached to the ceiling of the room), and a job to be carried out by the robot mechanism unit 899 is read from the database 902 so that the robot working space 3 is determined. At this time, it is supposed that the center of gravity and the radius of the robot working space 3 are denoted as G11 and R11 respectively, and that the center of gravity and the radius of the human action space 6 are denoted as G21 and R21 respectively.

Next, the control unit 900 determines whether or not there is a sufficient distance between the robot working space 3 and the human action space 6. More specifically, based upon the recognized information, respective intersections, formed by the straight line L1 connecting both of the centers of gravity (G11, G12) and the circumferences (R11, R12), are defined as (A1, B1), and it is determined whether or not a line segment A1-B1 is longer than a predetermined reference distance. As shown in FIG. 2, when there is a sufficient distance between the robot working space 3 and the human action space 6, that is, when the control unit 900 has determined that the line segment A1-B1 is longer than the reference distance, the control unit 900 may drive the second robot arm driving unit 907 so as to carry out a shielding operation in a middle point of the line segment A1-B1. More specifically, the control unit 900 may drive the second robot arm driving unit 907 so as to place the robot arm 7 at a position C1 in between that divides the line segment A1-B1 at a fixed ratio (for example, 2:1) to carry out the shielding operation. With this arrangement, since the shielding operation is positively carried out in the mid point between the robot working space 3 and the human action space 6, the possibility of making the robot arm 7 carrying out the shielding operation in contact with the person 5 is eliminated so that the shielding operation by the robot arm 7 is carried out safely to the person 5.

Figure 3:
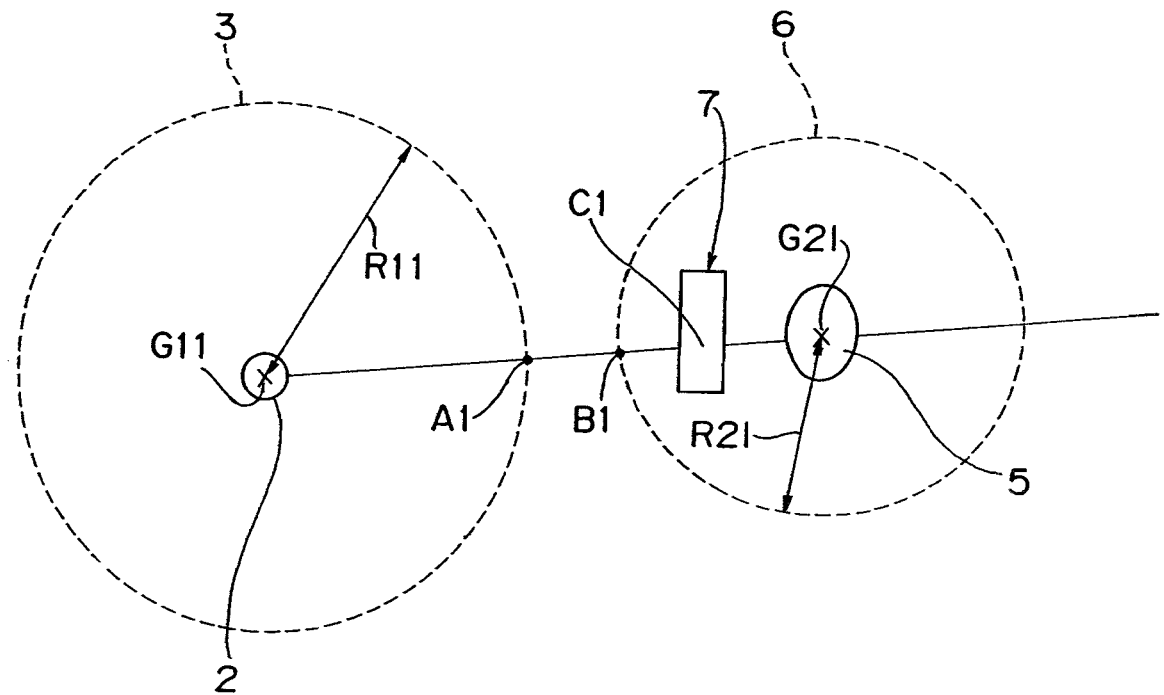
FIG. 3 is an explanatory view that explains a shielding operation determined based upon a relationship between a person and the working space of a robot mechanism unit in a robot apparatus in accordance with a third embodiment of the present invention.

(II) Moreover, as shown in FIG. 3, when the robot working space 3 and the human action space 6 are closely located with each other, that is, when the control unit 900 has determined that the line segment A1-B1 is equal to or shorter than the reference distance, the control unit 900 may drive the second robot arm driving unit 907 so as to carry out the shielding operation by using the robot arm 7, not at the middle point in the line segment A1-B1, but at the middle point in a line segment A1-G21 between the center of gravity G21 of the human action space 6 and the intersection A1, which is closer to the person side from the intersection B1. More specifically, for example, the control unit 900 may drive the second robot arm driving unit 907 so as to place the robot arm 7 at a position C1 in between that always divides the line segment A1-G21 at a fixed ratio (for example, 2:1) to carry out the shielding operation. In this case, however, since the robot working space 3 and the human action space 6 are close to each other, the robot arm 7 comes into the human action space 6 to carry out the shielding operation, with the result that there is a possibility of contact between the robot arm 7 and the person 5 depending on cases.

Figure 4:
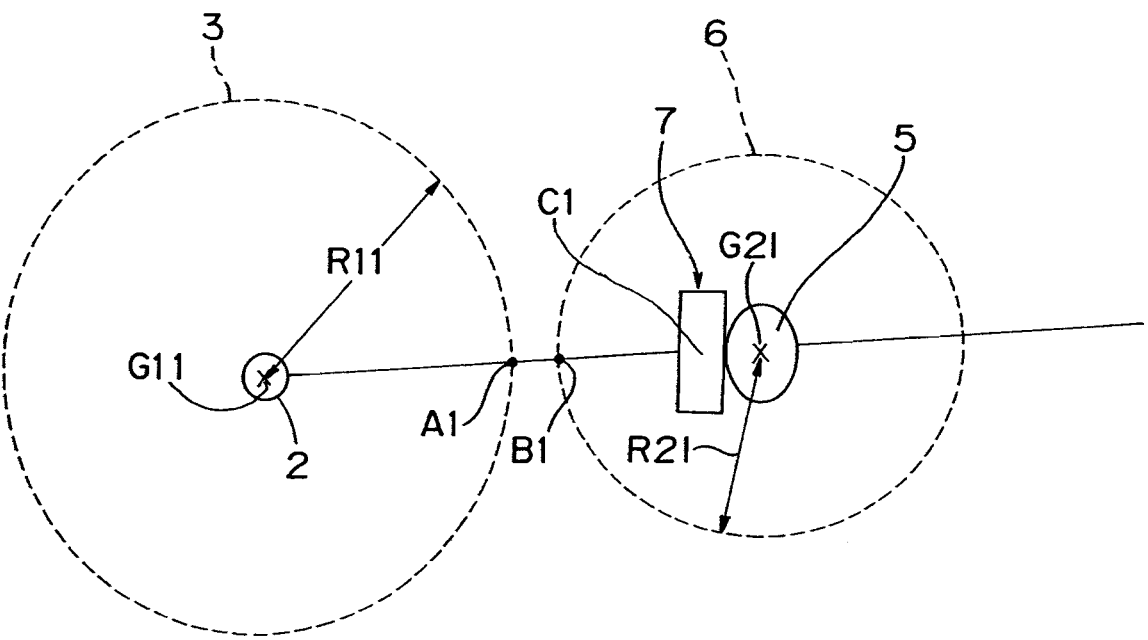
FIG. 4 is an explanatory view for explaining the shielding operation determined based upon a relationship between a person and the working space of the robot mechanism unit in the robot apparatus in accordance with the first embodiment of the present invention.

(III) Moreover, as shown in FIG. 4, when the robot working space 3 and the human action space 6 are further closely located with each other, that is, when the control unit 900 has determined that the line segment A1-B1 is equal to or shorter than a proximity warning distance that is significantly smaller than the reference distance, the control unit 900 may drive the second robot arm driving unit 907 so as to allow the robot arm 7 to touch the person 5 so that the movement of the human action space 6 toward the robot working space 3 is blocked while applying a force to the person 5 so as to stop the person 5.

In any of the above-mentioned cases (I), (II), and (III) shown in FIGS. 2 to 4, with respect to the robot arm 7 that might come into contact with a person 5, the surface of the robot arm 7 may be designed to have higher flexibility so as to provide compliance with the safety to the person 5 so that even if the person 5 came into contact with the robot arm 7, the person would not get hurt. For example, in the case where the distance between the person 5 and the robot arm 7 is short, by allowing the robot arm 7 to have a spring property through the compliance control, a person-friendly controlling operation is available even upon contact between the person 5 and the robot arm 7. Moreover, a sensor, such as a force sensor, may be placed at the contact portion between the robot arm 7 and the person 5, or the contact between the robot arm 7 and the person 5 may be estimated based upon the input/output relationship of the joint portion of the robot arm 7. Here, in the case of using a sensor such as a force sensor, upon detection of a contact to the person by the sensor, the operation of the robot arm 7 is stopped in some cases; however, since the robot arm 7 is made in contact with the person safely with a spring or a damper being exerted in response to the force from the person through the above-mentioned compliance control, there is no possibility of hurting the person.

By using the method shown in each of FIGS. 2 to 4 as described above, it is possible to positively prevent the person 5 from entering the robot working space 3.

The following description will discuss the present invention based upon more specific examples.

Figure 6A:
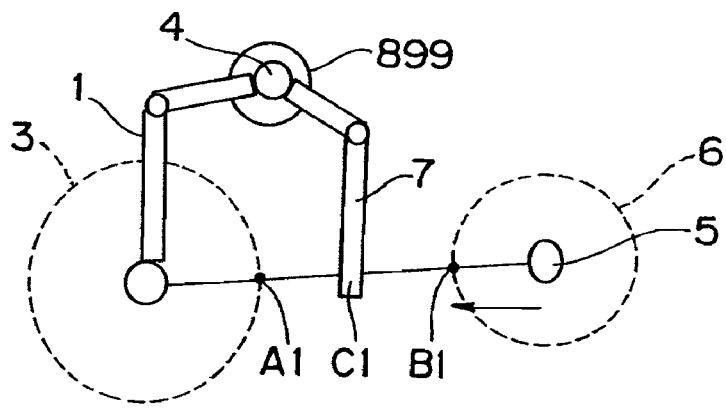
FIG. 6A is an explanatory view for explaining a shielding operation determined based upon a relationship between a person and the working space of the robot mechanism unit in the robot apparatus in accordance with the first embodiment of the present invention.
Figure 7:
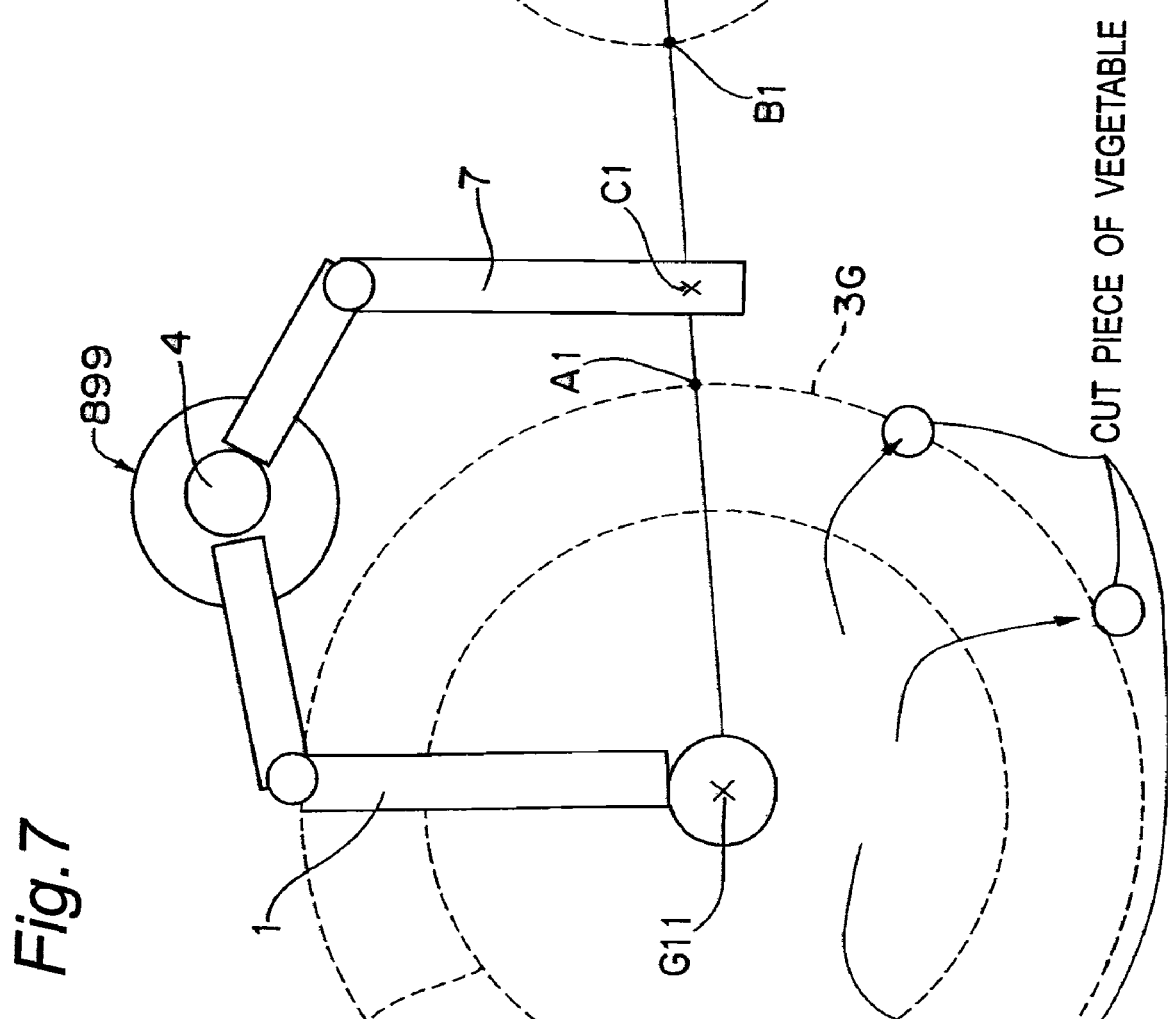
FIG. 7 is an explanatory view that shows a state in which objects are jumping out from the working space of the robot mechanism unit (a state in which, upon cutting vegetable with a kitchen knife held by the hand of a robot arm, cut pieces of the vegetable are scattered around) in the robot apparatus in accordance with the first embodiment of the present invention.

(I-a) For example, in the case where a cutting operation of a food material such as vegetable is being carried out by a kitchen knife held by the hand 1a of the robot arm 1, if a person 5 is at a position sufficiently apart from the robot arm 1, that is, if the control unit 900 has determined that the line segment A1-B1 is longer than the reference distance, the control unit 900 controls to drive the second robot arm driving unit 907 so as to carry out a shielding operation by the robot arm 7 between the robot working space 3 and the human action space 6, thus informing the person 5 of the fact that the shielding operation is being conducted (see FIG. 6A), and simultaneously, as shown in FIG. 7, in the case where there is a possibility of cut pieces of the vegetable being scattered from the working area of the kitchen knife held by the robot arm 1, the control unit 900 controls to drive the second robot arm driving unit 907 so as to carry out a shielding operation so that the proceeding path of the person 5 is blocked from a range 3G in which the cut pieces of the vegetable might be scattered. With respect to this shielding operation, the height and the position of the robot arm 7 are preferably set by taking into consideration the height and position that might be vulnerable to the scattered cut pieces of the vegetable. As to whether or not there is a possibility of cut pieces of vegetable jumping over, a determination is preliminarily made as to whether or not a safer spare range be set on the outside of the robot working space 3 during the operation by the robot arm 1 depending on the contents of the job, and may be stored in the database 902. Upon reading the job to be carried out by the robot mechanism unit 899 from the database 902, if the setting of the safer spare range is instructed, the robot working space 3 may be determined as a range including the safer spare range.

Figure 6B:
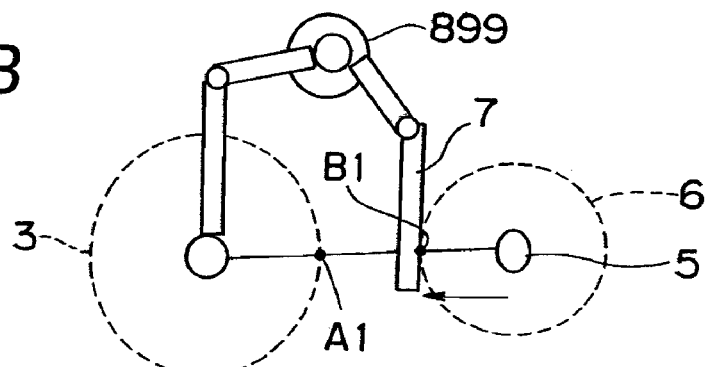
FIG. 6B is an explanatory view for explaining the shielding operation determined based upon a relationship between a person and the working space of the robot mechanism unit in the robot apparatus in accordance with the first embodiment of the present invention.
Figure 6C:
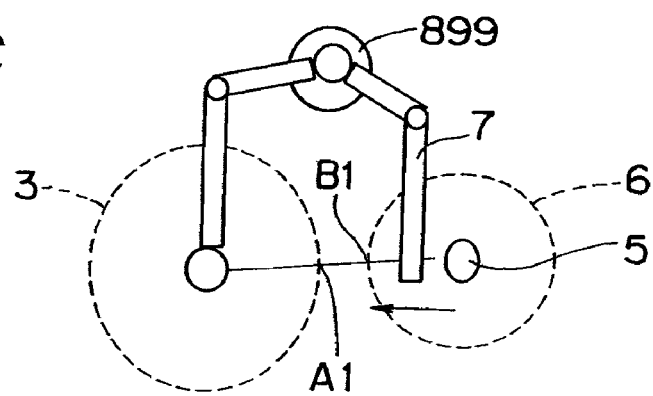
FIG. 6C is an explanatory view for explaining the shielding operation determined based upon a relationship between a person and the working space of the robot mechanism unit in the robot apparatus in accordance with the first embodiment of the present invention.

(II-a) In the case where in spite of the shielding operation being carried out against the person 5, the object recognizing unit 4 has detected that the person 5 is coming close to the robot working space 3 (see FIG. 6B), the control unit 900 controls to drive the second robot arm driving unit 907 so that the robot arm 7 is moved into the human action space 6 of the person 5 so as to carry out the shielding operation therein (FIG. 6C). Since this action makes it difficult for the person 5 to proceed toward the robot working space 3 because of the intervention by the robot arm 7, it becomes possible to more effectively prevent the person 5 from coming close to the robot working space 3.

(III-a) In the case where the person 5 has come sufficiently close to the robot working space 3, that is, when the control unit 900 has determined that the line segment A1-B1 is equal to or shorter than the proximity warning distance that is significantly smaller than the reference distance (see FIG. 6D), the robot arm 7 makes contact with the person 5 to block the person 5 so that the person 5 cannot proceed toward the robot working space 3; thus, it is possible to achieve a safer operation.

With respect to specific examples of numeric values, in the case of a job that is carried out by using a kitchen knife on a chopping board, for example, the working space of the robot may be set to a range having a diameter of 1 m, the area, determined by taking into consideration the scattering material, may be set to a range having a diameter of two meters, and when the working range of the person is set to a range having a radius of 1 m, the proximity warning area may be set as an area at which the working area of the person enters the robot working area by 30 cm (a range having a diameter of 1.6 m).

Moreover, with respect to the waving speed and amplitude of the waving operation of each of the above-mentioned cases (I), (II), and (III), specific examples of numeric values of the waving operation are shown below: (I) At the border of the range 3G which is vulnerable to scattered cut pieces of vegetable, the robot arm 7 may be allowed to laterally wave at about a frequency of 1 Hz with an amplitude of 50 cm. (II) In order to make it difficult for the person to approach, for example, the robot arm 7 may be allowed to wave at about a frequency of 2 Hz with an amplitude of 30 cm up and down, in front of the face, in a manner so as to shield the viewing field thereof. In the case of (III), in the waving range of the robot arm 7, since the robot arm 7 is in contact with the person, the robot arm 7 is stopped relative to the person, and a force may be applied to the person from the robot arm 7 in such a compliance control operation so as not to give an impact to the person.

Figure 8:
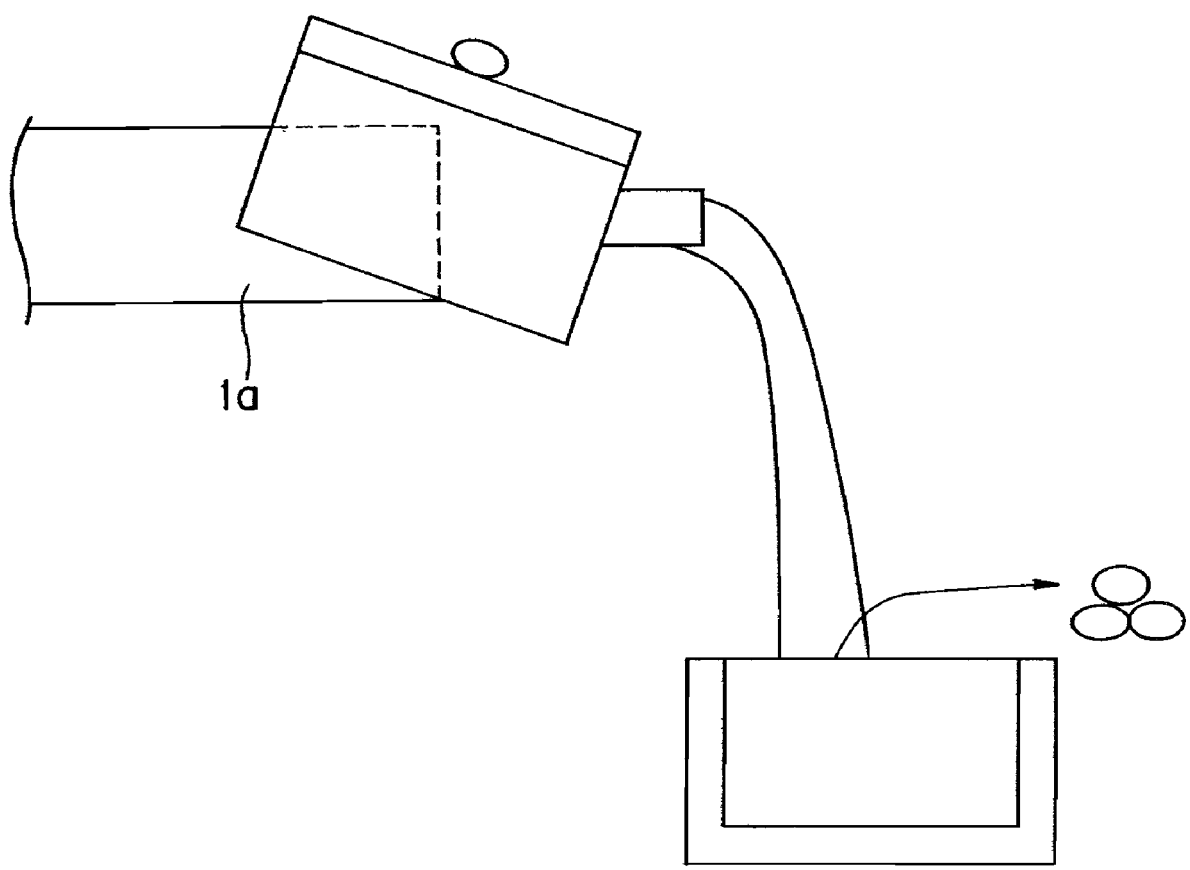
FIG. 8 is an explanatory view that shows another state in which objects are jumping out from the working space of the robot mechanism unit (a state in which, upon pouring boiling water into a container from a kettle held by the hand of a robot arm, hot water droplets are splashed around) in the robot apparatus in accordance with the first embodiment of the present invention.

In addition to the scattering cut pieces of vegetable, as shown in FIG. 8, in the case where, upon pouring boiling water into a container from a kettle held by the hand 1a of the robot arm 1, hot water droplets are splashed around, the shielding operation may be carried out in the same manner.

The above description has exemplified a case in which, when a person comes close to a space in which the robot is carrying out a job, a shielding operation is carried out in response to the distance, and the following description will exemplify a case in which shielding operations are switched in accordance with the contents of the job. With respect to the robot job, some jobs require the continuity of the jobs. For example, the heating job in cooking is listed. The reason that the continuity is important in the heating job in cooking is because, when a heating process is carried out intermittently without continuity, insufficient heating of the food material or excessive heating thereof tends to occur, impairing the taste of the food material. Therefore, it is only necessary to properly switch the shielding operations in response to the contents (continuity) of jobs. For a specific example of the job requiring the continuity, the following description will discuss a vegetable stir-frying job carried out by a robot, and the job sequence thereof is shown below (see FIG. 6E). For ease of explanation, it is supposed that the job steps of the vegetable stir-frying job include three steps. Step 1: preparing for food materials (washing, cutting, etc.). In the job of this step S1, no continuity is required. Step 2: heating the food materials. This step 2 requires the continuity from the reason as described above. Step 3: dishing up the food. In the job of this step S3, no continuity is required. For example, these pieces of information are stored in the database 902 as shown in FIG. 6E.

In this manner, the robot job is preliminarily divided into a certain number of steps, and those requiring continuity are combined into one lot of steps (step 2 in this example).

Figure 6D:
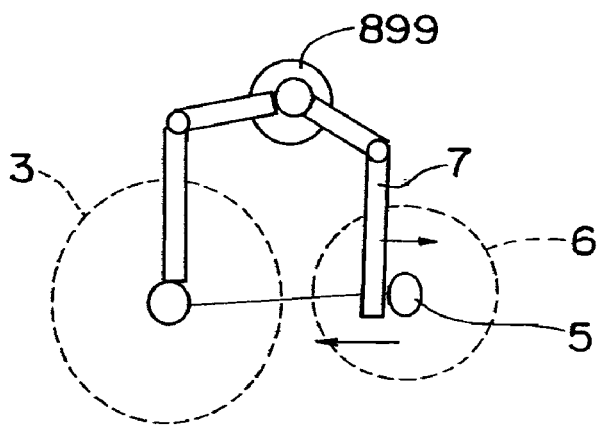
FIG. 6D is an explanatory view for explaining the shielding operation determined based upon a relationship between a person and the working space of the robot mechanism unit in the robot apparatus in accordance with the first embodiment of the present invention.

For example, in the case where, during the job of step S1 that is a cutting process of the food material, a person 5 is coming close thereto, as shown in FIG. 6D, and the shielding operation is carried out with the robot arm 7 being made to contact the person 5, the compliance property is increased so that the working speed within the robot working space 3 is changed in accordance with the contact force of the person 5 to the robot arm 7. In other words, when the contact force of the person 5 to the robot arm 7 is high, the working speed within the robot working space 3 is lowered, while, when the contact force of the person 5 to the robot arm 7 is low, the working speed within the robot working space 3 is increased in comparison with the case of the high contact force. As to whether or not the contact force of the person 5 to the robot arm 7 is high, for example, a contact sensor or the like attached to the robot arm 7 is used to detect the force, and based upon the result of detection, the control unit 900 may control the working speed within the robot working space 3.

In the case where, during the job of step S2 used for heating a food material, a person 5 is coming close, for example, as shown in FIG. 6D, and the robot arm 7 shields the person 5 in a manner so as to make contact with the person 5, since the continuity of the job at step S2 is high (the continuity is required), the force to be applied from the robot arm 7 to the person 5 is made higher than that of step S1 (with a lower compliance property) to carry out the shielding operation, and this shielding state is maintained until the sequence of operations of step S2 has been completed.

In the case where, during the job of step S3 used for dishing up, a person 5 is coming close, for example, as shown in FIG. 6D, and the robot arm 7 shields the person 5 in a manner so as to make contact with the person 5, the shielding operation is carried out in the same manner as step S1.

By changing the shielding operation in accordance with the contents (continuity) of jobs as described above, it becomes possible to positively complete the jobs.

In order to carry out the robot job as described above, information of the contents of each job and information relating to the necessity of continuity corresponding to the contents of the job are stored in the database 902 in association with each other, and the control unit 900 is allowed to read the pieces of information from the database 902, and determines the necessity of continuity of the contents of each job, and when the robot mechanism unit 899 is made to carry out the contents of a job that needs continuity, the robot mechanism unit 899 may be controlled so as to carry out a shielding operation different from that which is carried out based on the contents of a job without the necessity of continuity.

Moreover, as a modified example of the first embodiment, the following arrangement is proposed: A predicting means 910, which is connected to the control unit 900, and used for predicting the size and the shape of the human action space 6, is further prepared, and by using the predicting means 910, the size and the shape of the human action space 6 can be predicted.

Figure 9:
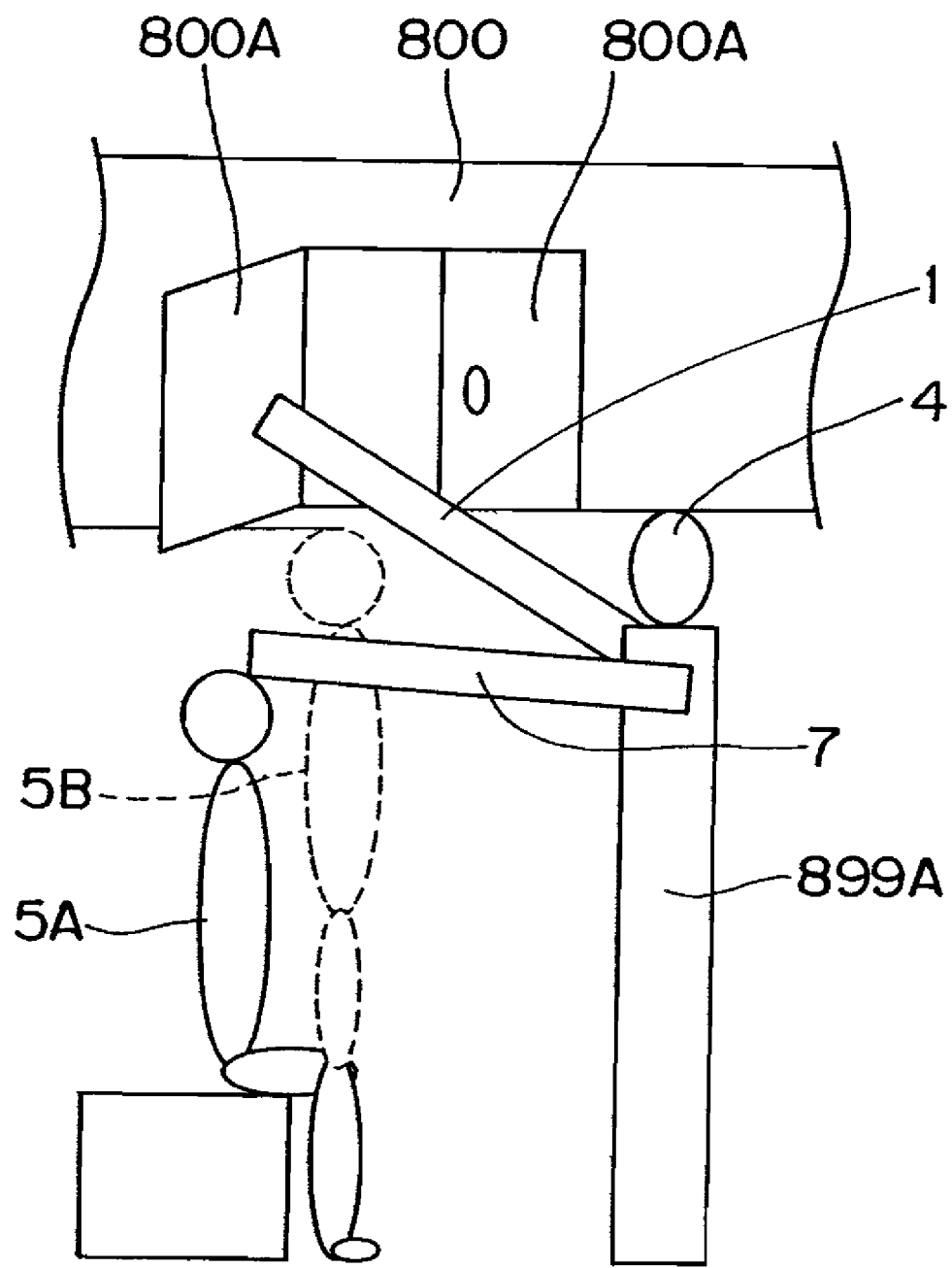
FIG. 9 is an explanatory view that shows a process in which a prediction means predicts an action of a person who will stand up from his sitting position to get an object placed on a higher position in a robot apparatus in accordance with a modified example of the first embodiment of the present invention.

For example, the relative relationship between the person 5 and the robot working space 3 is greatly changed depending on how the person 5 is going to move, or what action the person is going to take. However, based upon the recognized data obtained from the object recognizing unit 6 and the accumulated database 902, the action of the person 5 is predicted by the predicting means 910, and based upon the relative relationship derived from the prediction, the control unit 900 is allowed to drive the second robot arm driving unit 907 so that a shielding operation by the second robot arm 107 is carried out; thus, a safer operation is available. More specifically, as shown in FIG. 9, if the predicting means 910 has predicted the action of a person 5A who, although now sitting, is going to stand up to take something placed on a high position (to come into a state of the person 5B in FIG. 9), the space above the person 5 can also be recognized as the human action space 6 of the person 5 by the object recognizing unit 4 so that the safety of the job is further improved. More specifically, for example, suppose that a person 5A is sitting still in a chair. It is supposed that a shelf 800 with an open/close door 800A is placed above the person 5A. In the case where the job of the robot mechanism unit 899 is to open the door 800A and to take something therefrom, no problem is raised on security even when the door 800A is opened and closed because at present, the person 5A is sitting still. However, if the person 5A stands up (if coming into a state of the person 5B in FIG. 9), there is the danger that the door 800A might hit the head of the person 5B. In this case, by predicting the possibility of the person 5A taking an action of standing up, a shielding operation needs to be carried out so as not to allow the person 5A to stand up (for example, as shown in FIG. 9, a shielding operation is carried out above the person 5A by the robot arm 7). As described above, the possible action range and the action of the person are predicted so that the shielding operation for the person is determined.

Figure 10:
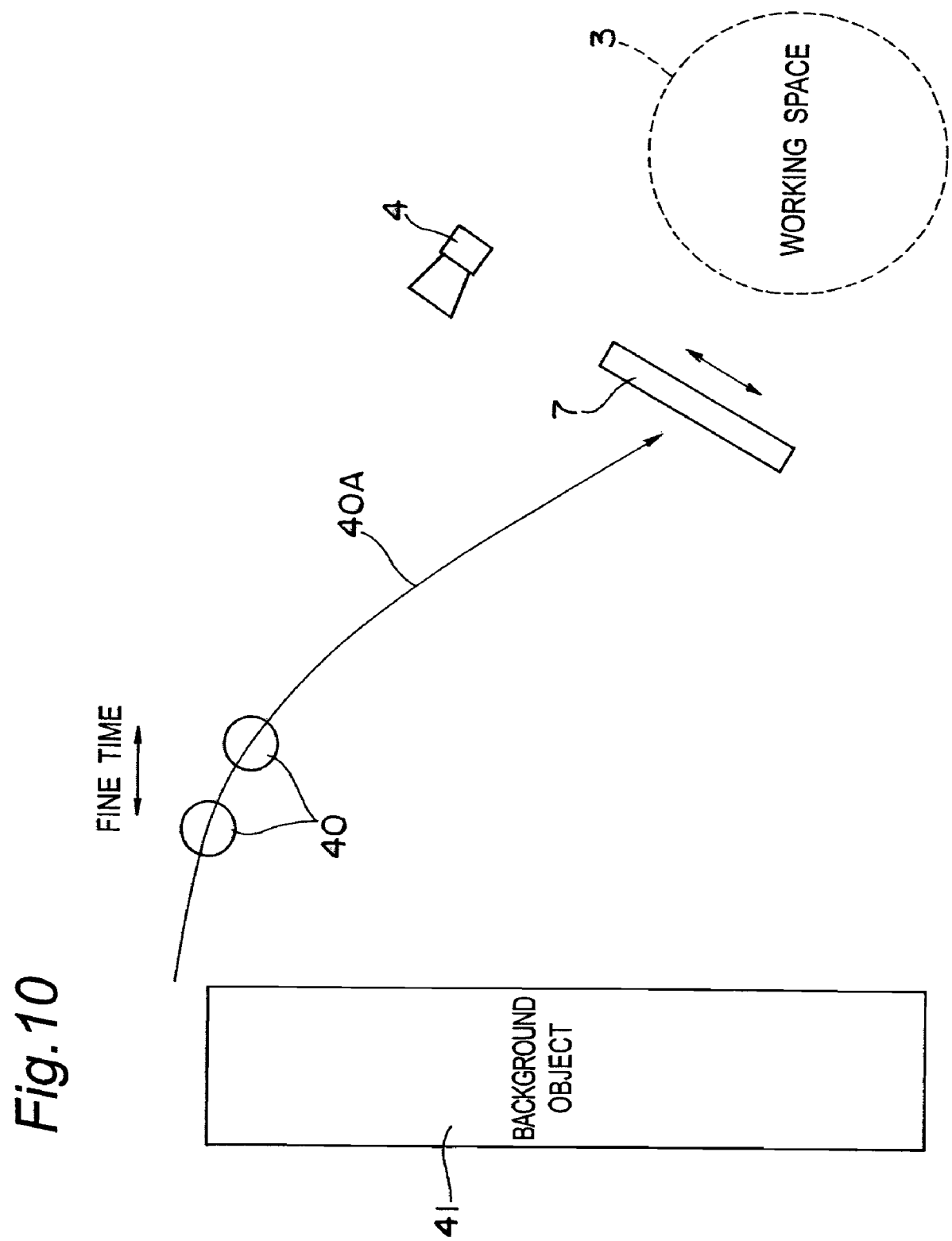
FIG. 10 is an explanatory view that shows a process in which, when a baseball ball flies into the working space of the robot mechanism unit in the robot apparatus, the course of the ball is predicted, in accordance with the first embodiment of the present invention.
Figure 12A:
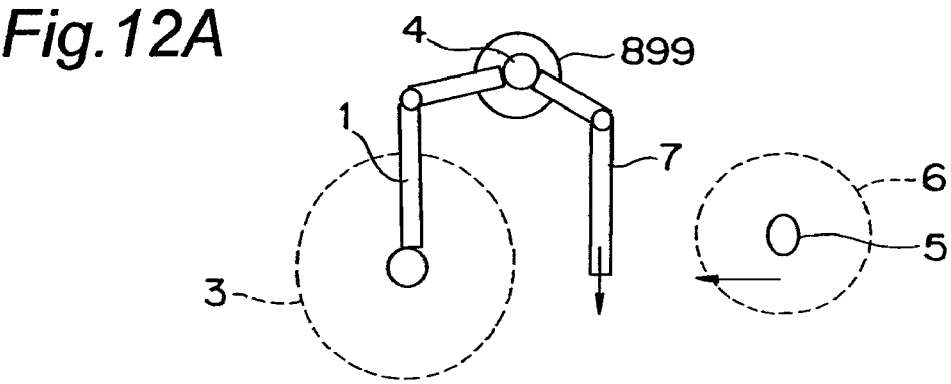
FIG. 12A is an explanatory view for explaining a shielding operation determined based upon a relationship between a person and the working space of a robot mechanism unit in a robot apparatus in accordance with still another modified example of the first embodiment of the present invention.
Figure 12B:
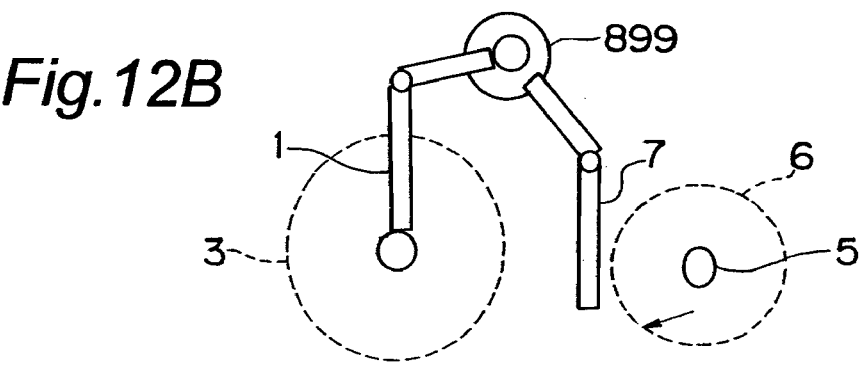
FIG. 12B is an explanatory view for explaining a shielding operation determined based upon a relationship between a person and the working space of a robot mechanism unit in a robot apparatus in accordance with still another modified example of the first embodiment of the present invention.
Figure 12C:
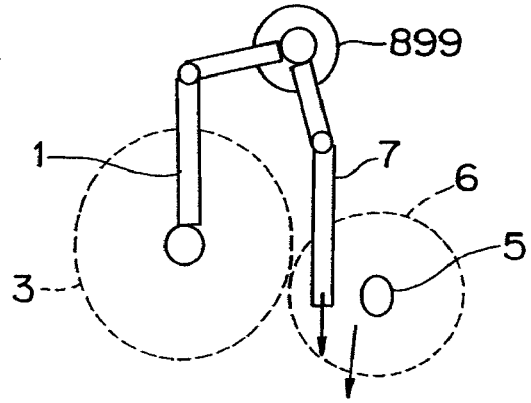
FIG. 12C is an explanatory view for explaining a shielding operation determined based upon a relationship between a person and the working space of a robot mechanism unit in a robot apparatus in accordance with still another modified example of the first embodiment of the present invention.
Figure 12D:
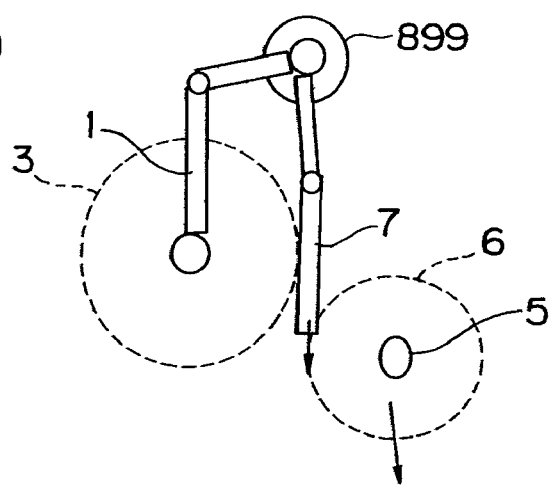
FIG. 12D is an explanatory view for explaining a shielding operation determined based upon a relationship between a person and the working space of a robot mechanism unit in a robot apparatus in accordance with still another modified example of the first embodiment of the present invention.

Moreover, as shown in FIG. 10, supposing that the object to be recognized is a baseball ball 40, the following description will exemplify a case in which the ball 40 flying toward the robot working space 3 is shielded. By recognizing a moving course 40A of the ball 40 by using the object recognizing unit 4 such as a camera, the moving course 40A of the ball 40 is predicted by the predicting means 910 based upon data as to which side the gravity is being exerted on so that it is possible to accurately predict which position the robot arm 7 should be placed at, while which angle is being set; thus, the control unit 900 is allowed to drive the second robot arm driving unit 907 to carry out the shielding operation by using the robot arm 7. Here, the predicting operation of the predicting means 910 is carried out in the following manner. In the case where, as shown in FIG. 10, the object to be recognized is a ball 40, for example, in the case of using a camera as the object recognizing unit 4, two continuous images are picked up in a fine period of time, and by comparing the size of a background object 41 that has been preliminarily known with a deviation of the moving distances of the ball 40, the size, speed, and height of the ball 40 are found. Based upon the results of these, by taking the gravity direction into consideration, it becomes possible to easily estimate preliminarily which position the ball 40 can reach after a lapse of predetermined seconds. Then, by using the results of the estimation, the shielding operation to be given to the current robot working space 3 is generated by the control unit 900 so that the shielding operation can be carried out more positively. Here, by allowing the robot arm 7 to carry out the shielding operation with a big waving range to a certain degree, the shielding operation is exerted in a wider space so that it becomes possible to properly deal with deviations in the moving course 40A of the ball 40.

As described above, by recognizing the robot working space 3 and by applying the predicting means 910 that carries out a predicting operation to the first embodiment, it becomes possible to carry out a better job.

FIG. 5A, which shows another modified example of the first embodiment of the present invention, is a schematic view that explains a control method of shielding operations that are carried out by taking into consideration the degree of danger with respect to the subject of the job. In FIGS. 2 to 4, the shielding operations are carried out based upon mechanical parameters such as a position; however, the following description will discuss a control method for shielding operations to which a new concept, that is, the degree of danger, is introduced.

For a simplified example, the following description will discuss a case in which, instead of a frying pan, a pan, held by the hand 1a of the robot arm 1, is carried onto a table from a gas range. Even in the case of the same jobs, the degree of danger to the person 5 is different between a cold pan and a hot pan having been heated. Of course, the hot pan is more dangerous. For this reason, the degree of danger is different even in the case of the same job with the same distance between the robot working space 3 and the person 5; therefore, in the case of a low degree of danger, the distance from the person 5 to the robot working space 3 may be set to a short distance, while in the case of a high degree of danger, it is necessary to keep the person 5 far away.

Moreover, even in the case of the same carrying job, with respect to the person 5 to be blocked, it is more dangerous when the subject is a child, a baby, or the like, in comparison with an adult who acts reasonably to a certain extent. For this reason, the degree of danger is set in accordance with the contents of a job and the object to be recognized. FIG. 5A shows an example of settings of the degree of danger. In an environment such as a home in which the person and the robot apparatus coexist, it is preferable to determine the shielding operation in accordance with the degree of danger, and, for example, the system may be designed so that the higher the degree of danger is, the closer the robot arm 7 is placed toward the person-5-side to carry out the shielding operation.

For example, the degree of danger is set as shown in FIG. 5A; in other words, supposing that the object to be recognized is an adult and that the pan is cold, this state is considered to be lowest in the degree of danger, and set to 100 as the degree of danger, and it is supposed that numeric values respectively shown in the Table are given depending on the objects to be recognized between an adult and a child, as well as on the objects of a job between a cold pan and a hot pan. In other words, when the object to be recognized is an adult and the pan is hot, the degree of danger is set to 150; when the object to be recognized is a child and the pan is cold, the degree of danger is set to 130; and when the object to be recognized is a child and the pan is hot, the degree of danger is set to 200. The robot working space 3 at the time when the degree of danger is 100 is multiplied by the degree of danger with respect to the person 5 so as to determine the size of the final robot working space 3. For example, in the case where the object to be recognized is a child and the pan is hot, since the degree of danger is 200, the size of the robot working space 3 in this case is a robot working space 3 having the size corresponding to a numeric value obtained by multiplying the robot working space 3 at the time when the degree of danger is 100 with respect to the person 5 by 200 of the degree of danger, that is, the robot working space 3 becomes a size two times larger than the robot working space 3 of 100 in the degree of danger. With this arrangement, the robot shielding operation with a reduced area that allows the person 5 to approach can be achieved. In the same manner, the human action space 6 may be expanded in accordance with the degree of danger so that the same shielding operation can be achieved.

In the same manner, the degree of danger may be set depending on physical properties such as the size and weight of the subject of the robot job. For example, supposing that a fruit held by the hand of a robot is carried by the robot arm as shown in FIG. 5B, the degree of danger is set two-dimensionally by using the weight and hardness of the fruit as parameters. In the case where the weight of the subject of the robot job (for example, an object to be carried) is big, the kinetic energy is great with a great impact upon contact; therefore, this state is dangerous. Moreover, when the subject of the robot job (for example, an object to be carried) is hard, there is a higher possibility that if the subject bumped into a person, the person would get hurt. When the degree of danger is high, the distance from the person 5 to the working space 3 may be made longer in comparison with the case in which the degree of danger is low. Moreover, as the degree of danger becomes higher, the operation speed of the robot arm may be reduced. Furthermore, as the degree of danger becomes higher, the term of a spring or a damper in the compliance control of the robot arm upon contact with the person may be made greater to provide flexibility.

The degree of danger is set, for example, as shown in FIG. 5B. In the case where the subject of the job is light and the hardness of the subject of the job is small, this state is regarded as the lowest in the degree of danger, and set to 100 as the degree thereof, and it is supposed that numeric values respectively shown in the Table are given depending on the weights of the subjects of the job between heavy and light, as well as on the hardness of the subjects of the job between hard and soft. In other words, when the weight of the subject of the job is heavy and the hardness of the subject of the job is small, the degree of danger is set to 150; when the weight of the subject of the job is light and the hardness of the subject of the job is high, the degree of danger is set to 120; and when the weight of the subject of the job is heavy and the hardness of the subject of the job is high, the degree of danger is set to 200. Then, a numeric value, obtained by multiplying, by the degree of danger, the robot working space 3 at the time of 100 in the degree of danger to the person 5, is defined as the size of a final robot working space 3. For example, in the case where the subject of the job is heavy and the hardness of the subject of the job is high, since the degree of danger is 200, the size of the robot working space 3 in this case is a robot working space 3 having the size corresponding to a numeric value obtained by multiplying the robot working space 3 at the time of 100 in the degree of danger to the person 5 by 200 of the degree of danger, that is, the robot working space 3 becomes a size two times larger than the robot working space 3 of 100 in the degree of danger. With this arrangement, the robot shielding operation with a reduced area that allows the person 5 to approach is achieved. In the same manner, the human action space 6 may be expanded in accordance with the degree of danger so that the same shielding operation can be achieved.

In the present specific example, the degree of danger is determined based upon the two parameters of weight and hardness; however, the number of parameters is not limited, and one or more parameters may be used, depending on the contents and state of the job.

FIG. 11 and FIGS. 12A to 12D, which show still another modified example of the first embodiment of the present invention, are schematic views that show a case in which a shielding operation is an operation used for directing the moving direction of an object. In FIGS. 2 to 4, a person 5 that is a recognized object is blocked by a shielding operation, and when the human action space 6 comes close to the robot working space 3, the person 5 is stopped by the robot arm 7, by further allowing contact with the person 5. In contrast, in this modified example of the first embodiment, the person 5 that is a recognized object is not stopped, but the moving direction of the person 5 is changed so that the job is executed while ensuring the safety of the job.

An explanation will be given by exemplifying a person 5 as the recognized object.

In the case where the person 5 comes close to the robot working space 3 (see FIG. 12A), the control unit 900 controls the second robot arm driving unit 907 so that a shielding operation is carried out by using the robot arm 7, while the robot arm 7 is simultaneously moved in a direction from a position A10 to a position A11. Alternatively, the robot arm 7 is made to take an action spatially in a flat manner so as to form a wall from the position A10 toward the position A11 (more specifically, by bending a portion between a first arm 7b and a second arm 7c, with a hand 7a and the first arm 7b being linearly held without bending a portion between them, the hand 7a and the first arm 7b are moved back and forth linearly) (see FIG. 12B). The person 5 sees and recognizes the robot arm 7, while the robot arm 7 is moved in the direction from the position A10 to the position A11. Alternatively, since the person recognizes as if the waving operation of the robot arm 7 formed a plane like a wall, the person changes the proceeding direction from a position B10 to a position B11 in a reflex action (see FIGS. 12C to 12D). In this manner, by carrying out a directing action for the person so as to change the direction of the action of the person 5, it is possible to avoid contact between the robot arm 7 and the person 5, and consequently to achieve a safer operation.

Here, the object to be recognized by the object recognizing unit 4 is exemplified as a person; however, the object may be an animal, or another robot, or a moving body such as a self-propelled appliance like a cleaning robot, or the like.

Examples of the animal include a dog, a cat, or the like, generally kept as a pet in a home, and the above-mentioned operation includes an operation used for blocking a dog, a cat, or the like so as to keep it away from the robot working space 3 of the robot mechanism unit 899. Examples of the moving body include a door to be used for opening and closing a refrigerator, a room, or the like. In the case where a door, when opened, crosses the robot working space 3, the position and operation of the door may be recognized by the object recognizing unit 4 so that a shielding operation is carried out so as to prevent the opening and closing space of the door from overlapping with the robot working space 3; thus, it becomes possible to carry out the operation more positively. Another example of the moving body is a baseball ball. Upon recognizing a baseball ball coming closer, by shielding its course, it is possible to prevent the ball from entering the working space.

In the first embodiment, the working robot arm 1 and the robot arm 7 are indicated as respectively separated mechanisms; however, in the case where the working robot arm 1 has a redundant degree of freedom, by utilizing the redundant degree of freedom in which the working robot arm 1 is not used for the corresponding operation, the robot arm 1 may be used for the shielding operation. Moreover, in the case of a robot with two arms, when the operation is sufficiently carried out by one of the robot arms, the other robot arm may be used for the shielding operation, or another third arm is attached, and the operation may be carried out by using the two arms, while the shielding operation is carried out by using the other arm.

In accordance with the above-mentioned arrangements, in the robot mechanism unit 899 in which the operation is carried out by using the working robot arm 1, the object recognizing unit 4 used for recognizing a person 5 (object to be recognized) is installed and by carrying out a shielding operation by using the robot arm 7 (one portion of the robot mechanism), a controlling operation is carried out so as to prevent from actively approaching from the robot side the human action space 6 (action space of the recognized object) of the person 5 recognized by the object recognizing unit 4; thus, it is possible to carry out a safe operation by using the working robot arm 1.

Second Embodiment

Figure 13:
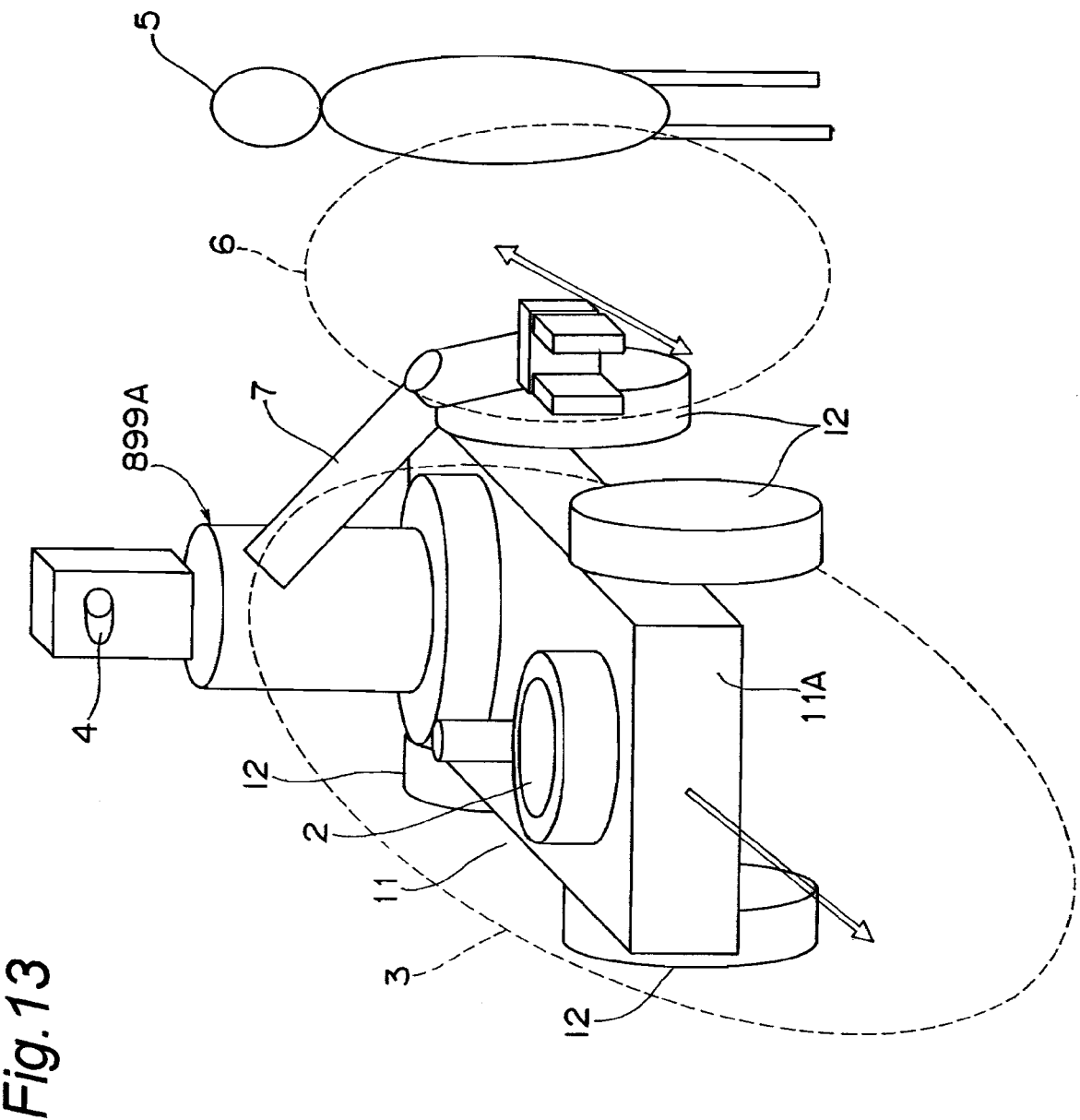
FIG. 13 is a schematic view that shows a work operation and a shielding operation of a robot apparatus in accordance with a second embodiment of the present invention.

FIG. 13 is a schematic view of work of a robot apparatus in accordance with a second embodiment of the present invention. In FIG. 13, those constituent elements that are the same as those shown in FIGS. 1A to 11 are indicated by the same reference numerals, and the explanation and the like thereof are omitted.

In FIG. 13, the robot apparatus is provided with a moving mechanism 11 for moving a robot main body 899A of the robot mechanism unit 899. In the present second embodiment, an explanation will be given by exemplifying the moving mechanism 11 of a wheel type. This moving mechanism 11 is constituted by a casing 11A that is secured to the robot main body 899A of the robot mechanism unit 899, two pairs of wheels 12 supported onto the casing 11A so as to freely rotate thereon, and a moving mechanism driving unit 911 such as a motor or the like, for driving the two pairs of wheels 12 so as to rotate forwardly as well as reversely so that the moving mechanism 11 can carry out advancing and retreating operations of the robot mechanism unit 899. Here, with respect to the contents of the operation, the moving mechanism 11 carries a frying pan 2 on the top portion thereof, and conducts a transporting operation thereof. When a person 5 comes close to the robot mechanism unit 899, the robot working space 3 and the human action space 6 come to overlap with each other. In this case, the transporting operation by the moving mechanism 11 needs to be stopped or slowed down to cause a reduction in the efficiency of the transporting operation. Here, for example, when the moving mechanism 11 advances, the moving mechanism 11 itself and its advancing direction may be defined as the robot working space 3.

For convenience of explanation, the wheel mechanism is taken as the moving mechanism 11; however, a legged mechanism, a crawler mechanism, or a mechanism for moving on a track such as rails, may be used.

In the same manner as the first embodiment, the present second embodiment will exemplify a case in which one portion of the robot mechanism unit 899, which carries out a shielding operation, is a robot arm 7. Moreover, in the same manner as the first embodiment, it will also exemplify a case in which a person 5 is taken as the object to be recognized by the object recognizing unit 4.

The robot mechanism unit 899 carries out a shielding operation by using a robot arm 7 (a part of the robot mechanism unit 899) so as to prevent the human action space 6 (action (motion) space of the object to be recognized) from coming close to the robot working space 3.

First, the robot mechanism unit 899 recognizes the human action space 6 of a person 5 by using the object recognizing unit 4. The human action space 6 is not necessarily always stationary, and moves in response to the movement of the person 5. For this reason, the control unit 900 controls the second robot arm driving unit 907 to drive the robot arm 7 (one portion of the robot mechanism unit 899) in accordance with the movement of the person 5 to block and shield the movement of the person so as to prevent the human action space 6 (action space of the object to be recognized) from coming close to the robot working space 3. With respect to the shielding operation, the control unit 900 controls the second robot arm driving unit 907 to drive to robot arm 7 so that at least a portion on the tip side thereof is positioned at the middle portion of an area between the robot working space 3 and the human action space 6. With this arrangement, the advance of the person 5 can be blocked to prevent the human action space 6 from coming close to the robot working space 3.

Here, with respect to the shielding operation, the same operation as the shielding operation of the first embodiment is used.

In accordance with the above-mentioned arrangement, in the robot mechanism unit 899 provided with the moving mechanism 11, the object recognizing unit 4 is installed, and by carrying out the shielding operation by using the robot arm 7 (one portion of the robot mechanism unit 899), the controlling operation is carried out on the human action space 6 (action space of the recognized object) recognized by the object recognizing unit 4 actively from the robot side; thus, it is possible to carry out a safe transporting operation by using the moving mechanism 11.

For a specific example, the above-mentioned operation corresponds to the following process: in the case where, upon carrying out a waiter job such as carrying food put on a tray (for example, rice, miso soup, and pickles) to a certain table, the moving mechanism 11 is not allowed to move in the advancing direction because of an approaching person 5, the advancing path of the person 5 is blocked by using one of the robot arms to ensure the advancing path of the moving mechanism 11, and the moving mechanism 11 is then allowed to move to carry out the waiter job.

Third Embodiment

Figure 14:
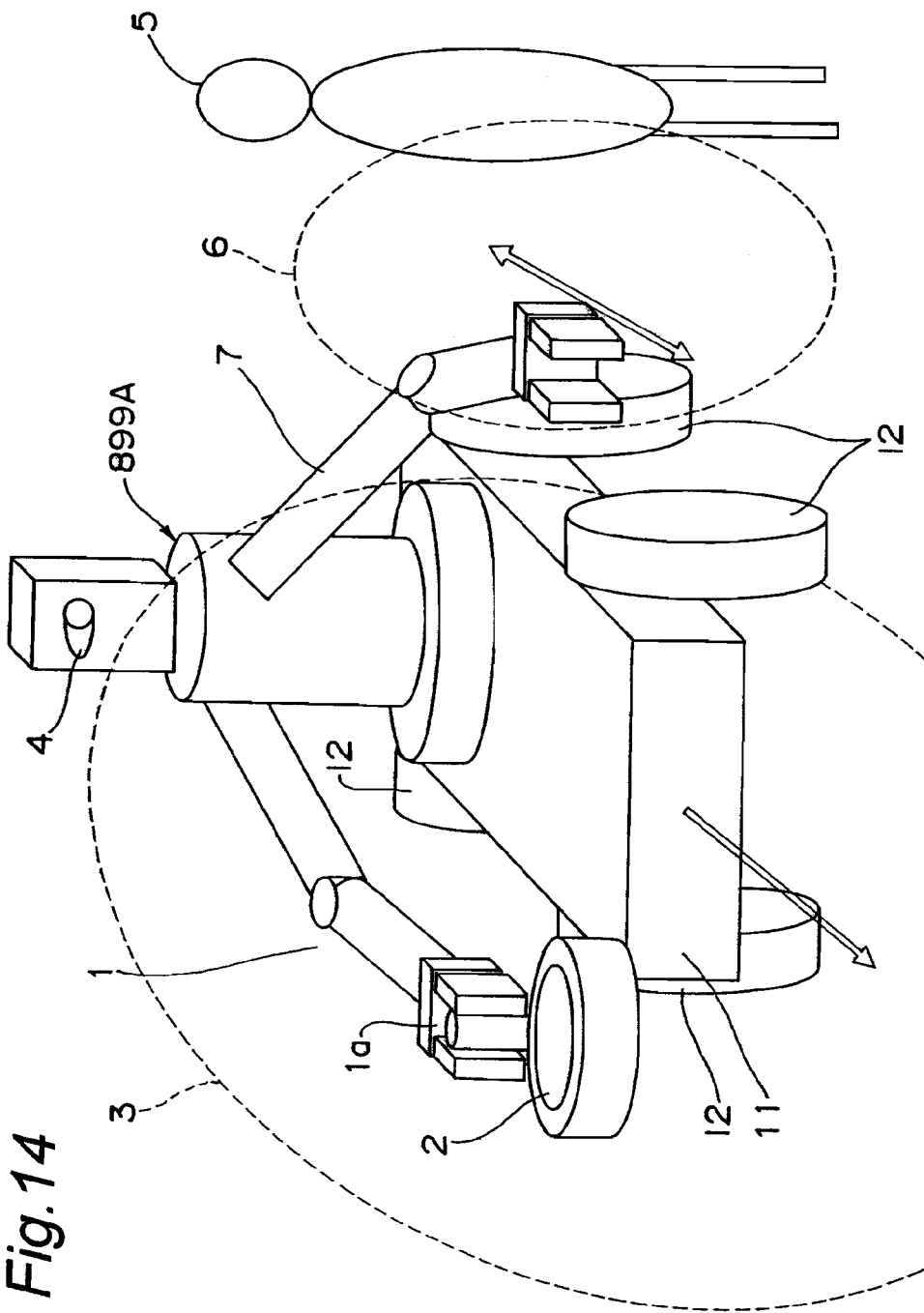
FIG. 14 is a schematic view that shows a work operation and a shielding operation of the robot apparatus in accordance with the third embodiment of the present invention.

FIG. 14 is a schematic view of work of a robot apparatus in accordance with a third embodiment of the present invention. In FIG. 14, those constituent elements that are the same as those shown in FIGS. 1A to 13 are indicated by the same reference numerals, and the explanation thereof is omitted.

In FIG. 14, the robot apparatus is provided with the working robot arm 1 and a moving mechanism 11 for use in work, and in the same manner as the second embodiment, an explanation will be given by exemplifying the moving mechanism 11 of a wheel type. This moving mechanism 11 for use in work can be moved by four wheels 12 when driven by the moving mechanism driving unit 911 under the control of the control unit 900, and with respect to the contents of the job, the example thereof includes a job in which, while a frying pan 2, held by a hand 1a of the working robot arm 1, is being moved upward by the driving operation of the first robot arm driving unit 901 under the control of the control unit 900, the frying pan 2 is placed on a predetermined shelf (not shown) with the robot main body 899A being moved by the moving mechanism 11. This job is achieved by carrying out cooperative driving operations by the first robot arm driving unit 901 and the moving mechanism driving unit 911 under the control of the control unit 900 so that a cooperative operation between the two operations of the action operation of the working robot arm 1 and the moving operation of the moving mechanism 11 is carried out. Since the degree of freedom to be used in the job is increased as compared with those of the first embodiment and the second embodiment, the corresponding robot working space 3 becomes larger in comparison with the robot working space 3 (robot working space of the first embodiment) used only for the job of the working robot arm 1 and the robot working space 3 (robot working space of the second embodiment) used for the moving mechanism 11. The contents of the job may be those of any job as long as they are carried out in cooperation with the moving mechanism 11 and the working robot arm 1.

In the same manner as the first embodiment, the present third embodiment will exemplify a case in which one portion of the robot mechanism unit 899, which carries out a shielding operation, is a robot arm 7. Moreover, in the same manner as the first embodiment, it will also exemplify a case in which a person 5 is taken as the object to be recognized by the object recognizing unit 4.

The robot mechanism unit 899 carries out a shielding operation by using the robot arm 7 (one portion of the robot mechanism unit 899) so as to prevent the human action space 6 (action (motion) space of the object to be recognized) from coming close to the robot working space 3.

First, the robot mechanism unit 899 recognizes the human action space 6 of the person 5 by using the object recognizing unit 4. The human action space 6 is not necessarily always stationary, and moves in response to the movement of the person 5. For this reason, the control unit 900 controls the second robot arm driving unit 907 to drive the robot arm 7 (one portion of the robot mechanism unit 899) in accordance with the movement of the person 5 to block and shield the movement of the person so as to keep the human action space 6 (action space of the object to be recognized) away from coming close to the robot working space 3. With respect to the shielding operation, the control unit 900 controls the second robot arm driving unit 907 to drive robot arm 7 so that at least a portion on the tip side thereof is positioned at the middle portion of an area between the robot working space 3 and the human action space 6. With this arrangement, the advance of the person 5 is blocked to prevent the human action space 6 from coming close to the robot working space 3.

In accordance with the above-mentioned arrangement, in the robot that is provided with the working robot arm 1 and the moving mechanism 11 for use in work, and also has the object recognizing unit 4, by carrying out the shielding operation by using the robot arm 7 (one portion of the robot mechanism unit 899), a controlling operation is carried out on the human action space 6 of the person 5 recognized by the object recognizing unit 4 actively from the robot side; thus, it is possible to carry out a safe job through the cooperative operations by the working robot arm 1 and the moving mechanism 11 for use in work.

Fourth Embodiment

Figure 15:
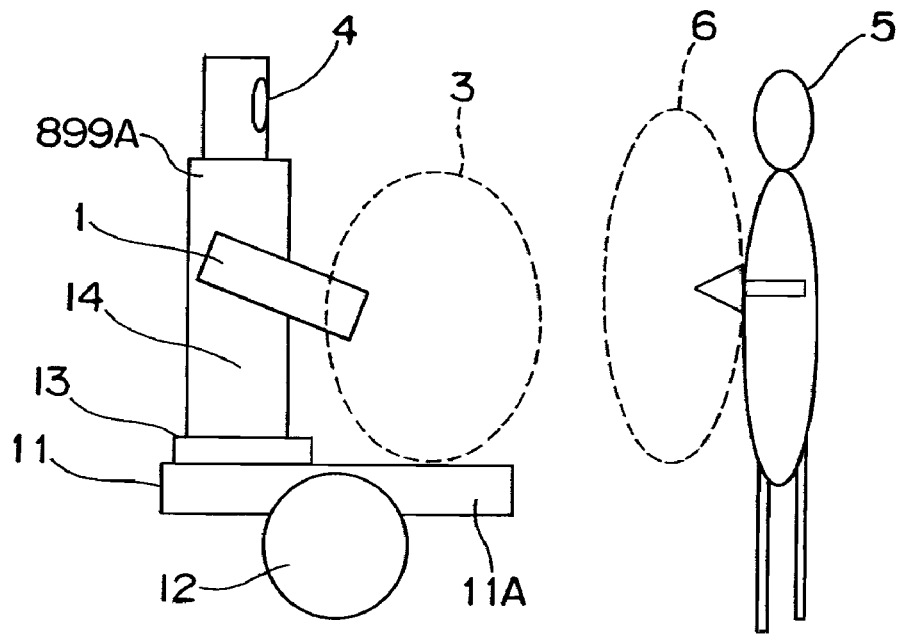
FIG. 15 is a schematic view that shows a work operation of a robot apparatus in accordance with a fourth embodiment of the present invention.
Figure 16:
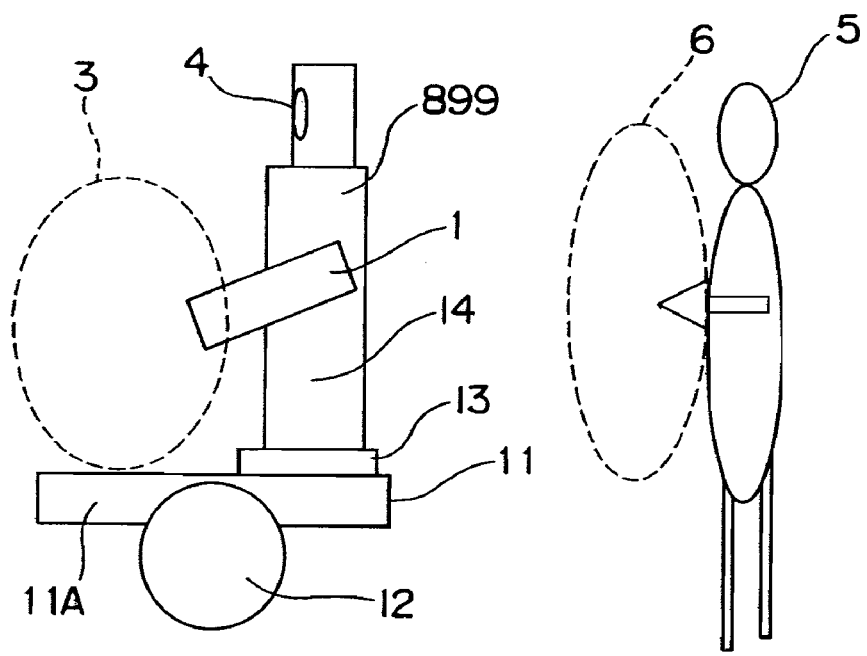
FIG. 16 is a schematic view that shows a work operation of the robot apparatus in accordance with the fourth embodiment of the present invention.
Figure 17:
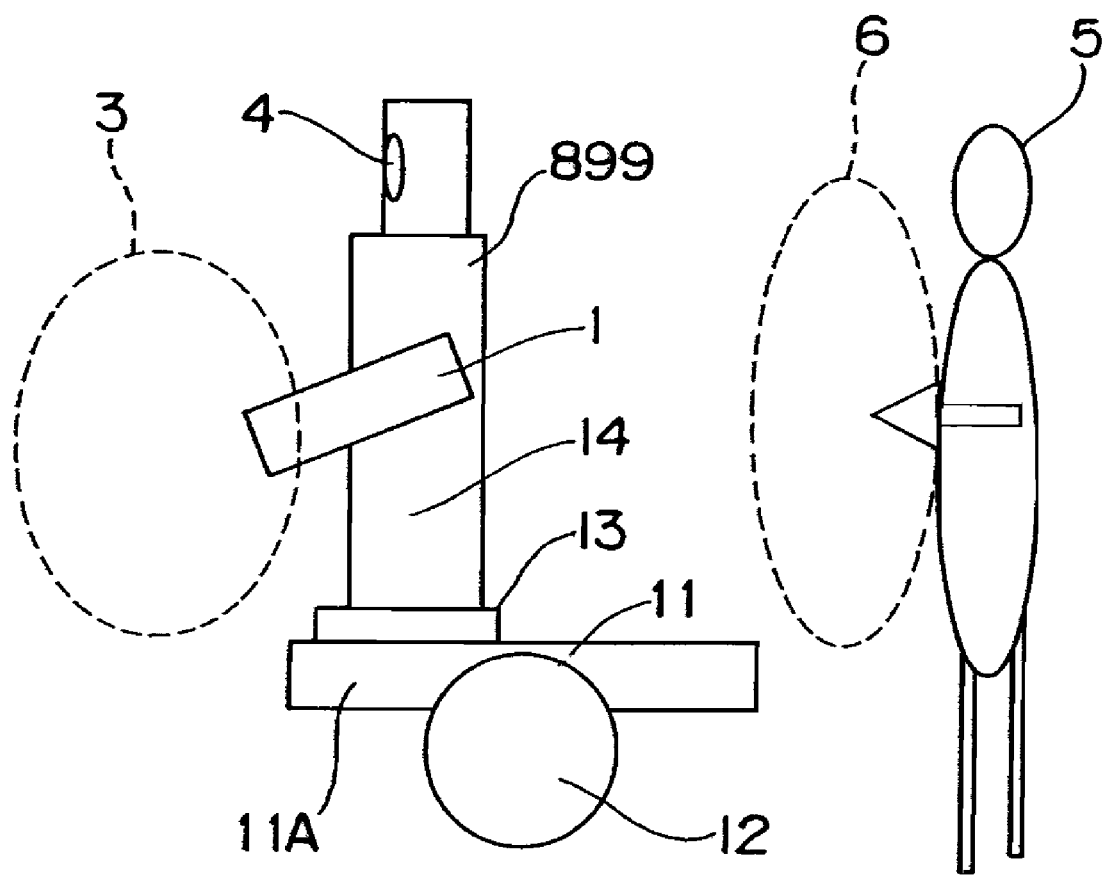
FIG. 17 is a schematic view that shows a work operation of a robot apparatus in accordance with a modified example of the fourth embodiment of the present invention.

FIGS. 15, 16, and 17 are schematic views of work of a robot apparatus in accordance with a fourth embodiment of the present invention. In FIGS. 15, 16, and 17, those constituent elements that are the same as those shown in FIGS. 1A to 14 are indicated by the same reference numerals, and the explanation thereof is omitted.

In FIG. 15, the robot mechanism unit 899 is provided with the working robot arm 1 and the moving mechanism 11 for use in work. In a robot working space 3, for example, the robot mechanism unit 899 is supposed to carry out a peeling job on an apple by using a kitchen knife by the use of the working robot arm 1. In order to allow the robot mechanism unit 899 to execute the job, it is necessary to ensure the robot working space 3 and also to prevent the robot working space 3 and the human action space 6 of the person 5 from overlapping with each other. In the methods shown in the first to third embodiments, by shielding the human action space 6 of the person 5 using the robot arm 7 (one portion of the robot mechanism unit 899), the movement of the human action space 6 of the person 5 is blocked. Although these methods of the first to third embodiments are also effective, the present fourth embodiment will discuss a method for achieving a job in which the working space 3 of the robot mechanism unit 899 is being shield by one portion of the robot mechanism unit 899 other than the robot arm 7 so as to keep the person 5 away therefrom.

Here, the present fourth embodiment will also exemplify a case in which a person 5 is taken as the object to be recognized by the object recognizing unit 4.

In the case where the person 5 comes close to the robot mechanism unit 899 as shown in FIG. 15, as shown in FIG. 16, by using the moving mechanism 11 (for example, wheels 12 in the case of the wheel mechanism), the control unit 900 controls the moving mechanism driving unit 911 to drive the casing 11A so that the direction of one portion or the entire portion of the wheels 12 is changed to rotation-drive the wheels 12; thus, together with the moving mechanism 11, the robot main body 899A of the robot mechanism unit 899 is allowed to pivot so that the main body 899A (the trunk portion 14 (one portion of the robot mechanism unit 899) in FIGS. 15 and 16) of the robot mechanism unit 899 is positioned at the middle point between the robot working space 3 and the human action space 6 (action space of the object to be recognized) so as to shield the person 5 by using the trunk portion 14 that is one portion of the robot mechanism unit 899. In the present shielding operation of FIG. 17, by shielding to separate the human action space 6 and the robot working space 3 by the use of the trunk portion 14 that is one portion of the robot mechanism unit 899 so as to keep the robot working space 3 away from the human action space 6, the robot job can be continued.

Moreover, as shown in FIG. 17, even in the case where the pivotal movement by the moving mechanism 11 for use in work is not used, a pivotal joint mechanism 13 capable of pivoting on the casing 11A may be installed between the lower portion of the robot main body 899A and the casing 11A, and a pivotal joint mechanism driving unit 913 used for driving the pivotal joint mechanism 13 may be installed; thus, the control unit 900 controls the pivotal joint mechanism driving unit 913 to drive the pivotal joint mechanism 13 so that the robot mechanism unit 899 is allowed to pivot on the casing 11A, and the robot working space 3 and the human action space 6 can be shielded to separate from each other by a portion (one portion of the robot mechanism unit 899) of the moving mechanism 11 of the robot mechanism unit 899 where no robot main body 899A is placed. Here, suppose that as shown in FIG. 15, the robot main body 899A, placed on one end of the casing 11A of the moving mechanism 11 to face the other end side (right side in FIG. 15) of the casing 11A, is carrying out a job in the robot working space 3. At this time, in the present shielding operation, with respect to the human action space 6 and the robot working space 3, as shown in FIG. 17, the robot main body 899A on one end side of the casing 11A of the moving mechanism 11 is allowed to face the side (left side of FIG. 15) opposing the other end side (right side of FIG. 15) by the pivotal movement of the robot main body 899A carried out by the pivotal joint mechanism 13, and carries out the job in the robot working space 3 on the side opposing the person 5. With this arrangement, it is possible to prevent the person 5 from coming close to the robot working space 3 by using the other end side (one portion of the robot mechanism unit 899) of the casing 11A of the moving mechanism 11, and consequently to continue the robot job by keeping the robot working space 3 away from the human action space 6.

In accordance with this arrangement, in the case of a job that can be continued even when the robot working space 3 is moved, by using the pivotal movement by the moving mechanism 11 or by using the pivotal movement by the pivotal joint mechanism 13 in the arrangements of the first embodiment, second embodiment, and third embodiment, one portion of the robot mechanism unit 899, such as the trunk portion 14 or one portion of the moving mechanism 11 on which no robot main body 899A is placed, is used for shielding to separate the robot working space 3 and the human action space 6 from each other so that the corresponding job can be achieved. Moreover, by simultaneously carrying out the shielding process by the shielding means such as the robot arms 1 and 7 and the shielding process by the pivotal movement, it becomes possible to provide a safer job.

Figure 18A:
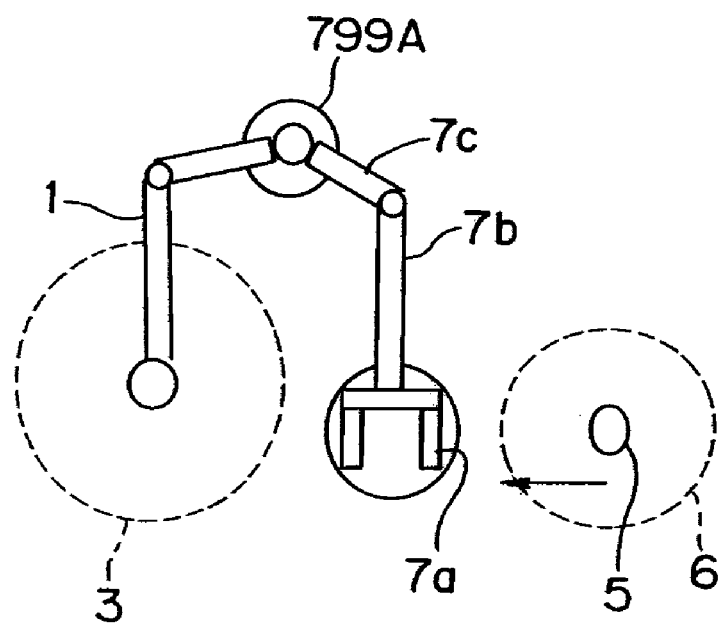
FIG. 18A is a schematic view that shows a waving operation of a robot apparatus in accordance with a modified example of the first to fourth embodiments of the present invention.
Figure 18B:
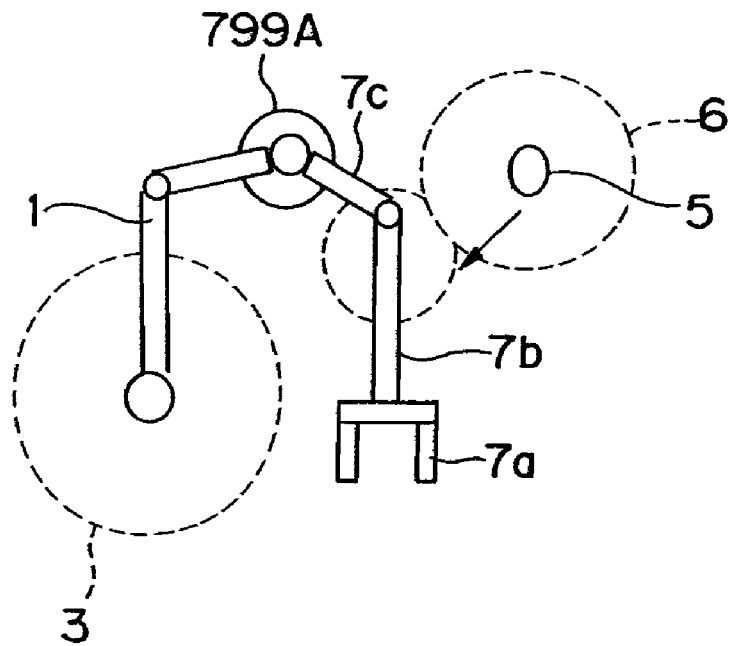
FIG. 18B is a schematic view that shows a waving operation of the robot apparatus in accordance with the modified example of the first to fourth embodiments of the present invention.
Figure 19:
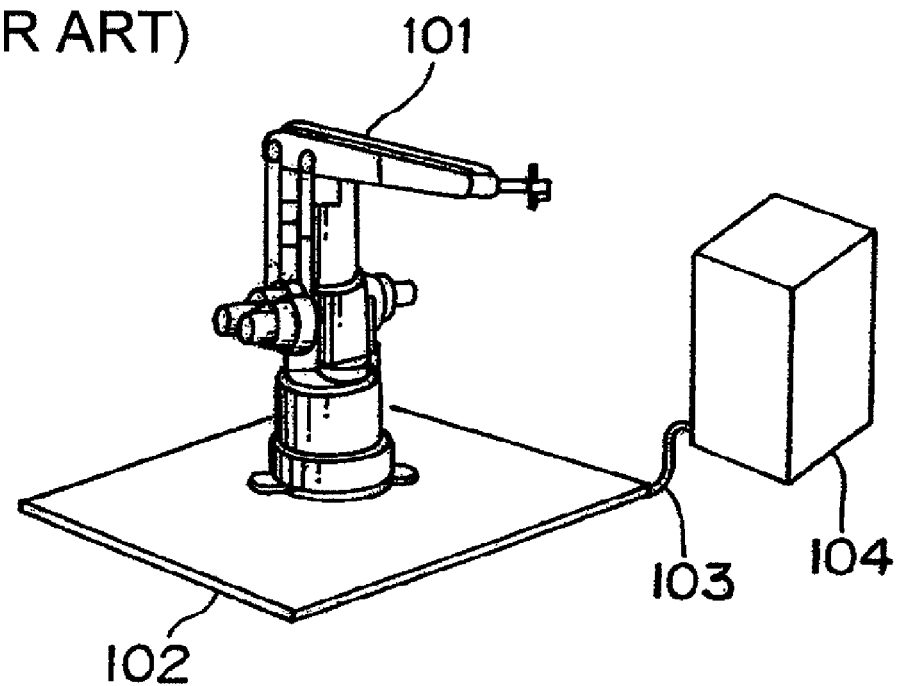
FIG. 19 is a view that shows a safety device for a prior art robot.
Figure 20:
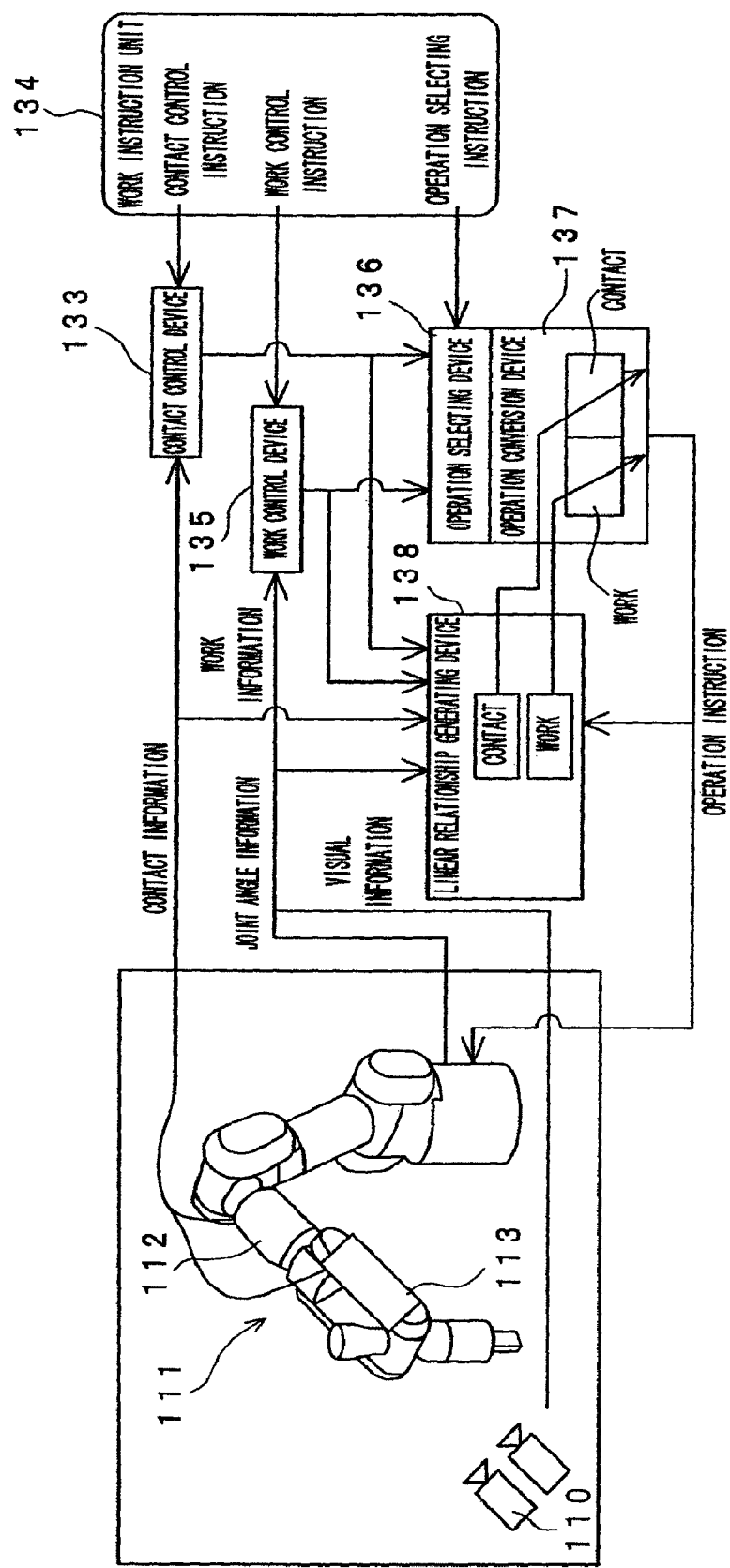
FIG. 20 is a view that shows a control device for a prior art robot having a touch sensor.
Figure 21:
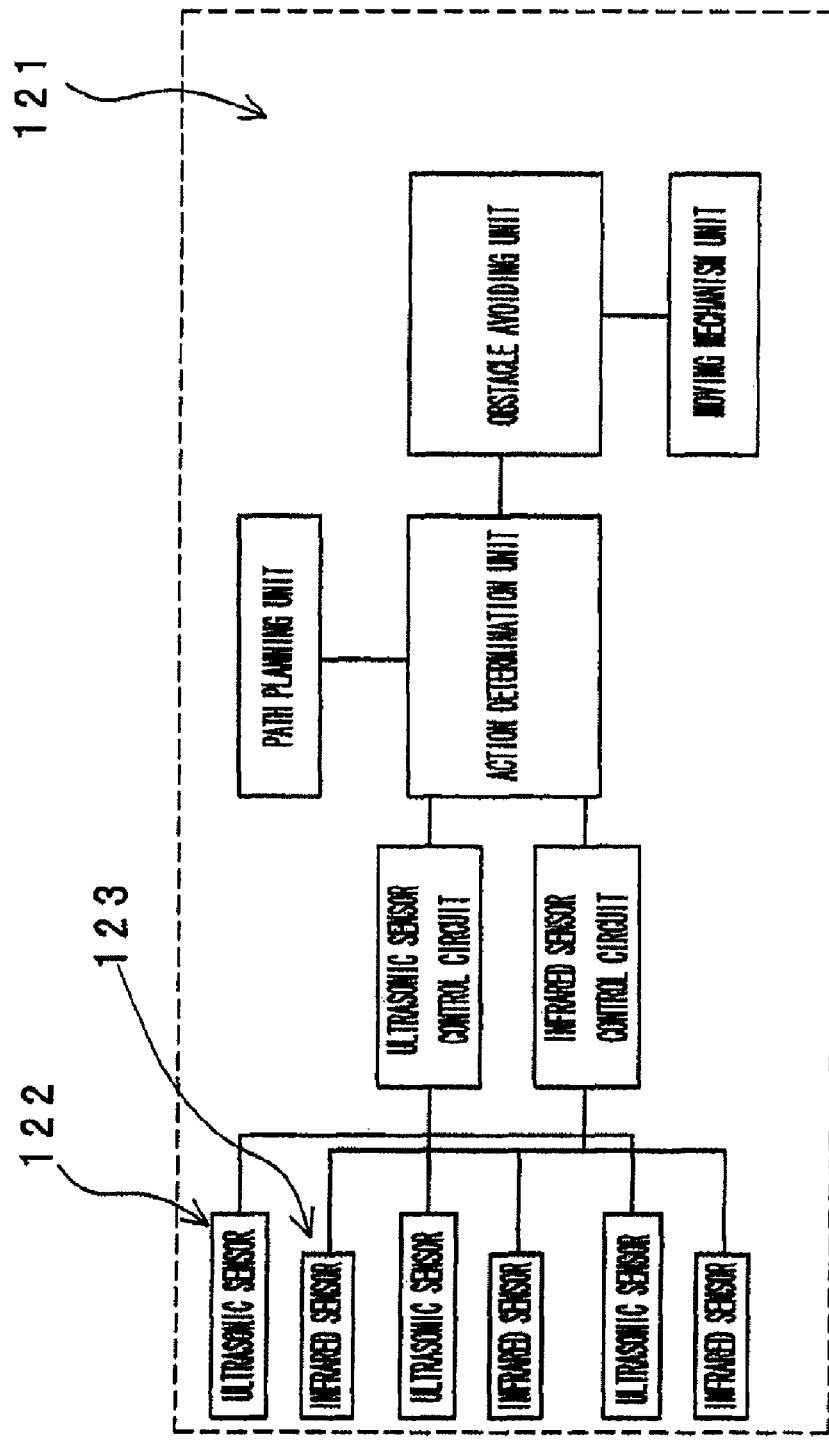
FIG. 21 is a block diagram that shows a prior art autonomous moving device.
Figure 22A:
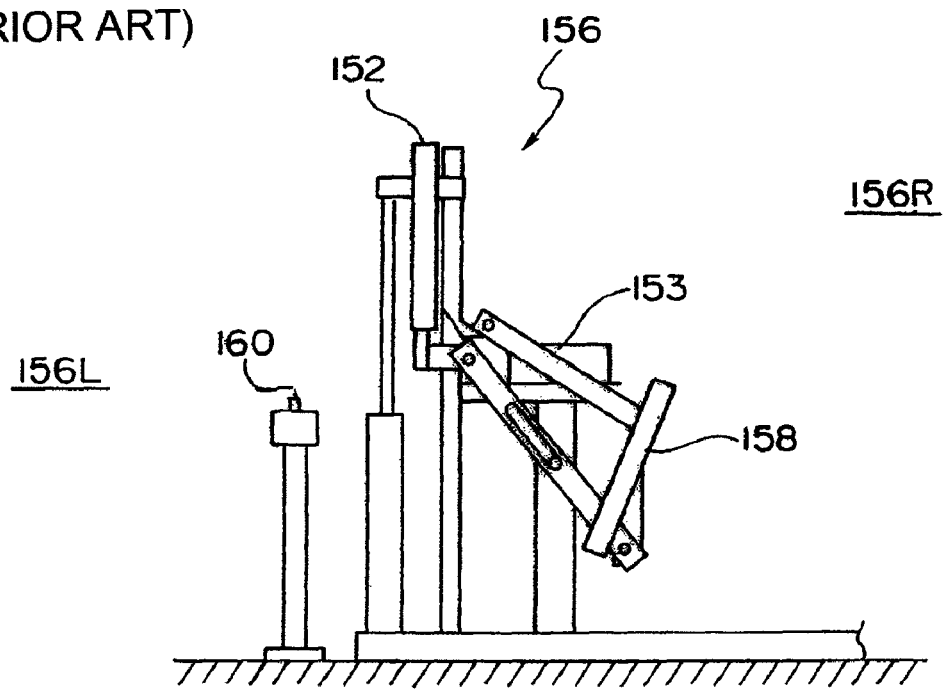
FIG. 22A is a view that shows a safety device for a prior art robot.
Figure 22B:
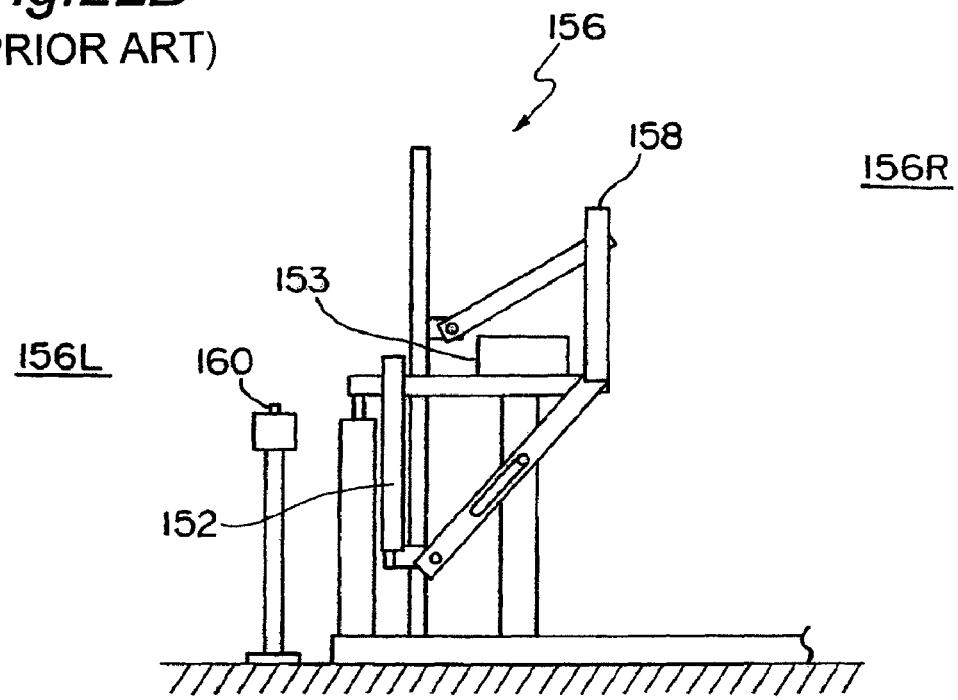
FIG. 22B is a view that shows the safety device for the robot shown in FIG. 22A.

The present invention is not intended to be limited by the above-mentioned embodiments, and can be achieved by using various other modes. For example, upon carrying out the shielding operation by allowing the robot arm 7 or 1 to wave, the waving operation is not limited to a waving operation by the use of the hand 7a, the first arm 7b, and the second arm 7c, and as shown in FIG. 18A, the shielding operation may be carried out by allowing only the hand 7a to wave, or as shown in FIG. 18B, the shielding operation may be carried out by allowing the first arm 7b, the second arm 7c, and the elbow portion to wave.

By properly combining the arbitrary embodiments of the aforementioned various embodiments, the effects possessed by the embodiments can be produced.

In accordance with the robot apparatus of the present invention, it is possible to actively ensure a robot working space by shielding a person by the use of one portion of the robot mechanism unit; therefore, even in an environment in which a person and a robot share a space, the robot is allowed to carry out a job safely so that it is possible to provide an effective robot controlling method in the field of domestic robots.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A robot apparatus comprising:
 a robot mechanism unit having a plurality of robot arms and a robot main body to which the robot arms are attached;
 an object recognizing unit for recognizing any one or a plurality of objects among three types of objects including a moving object, an animal, and a person as an object to be shielded; and
 a control unit for controlling the robot mechanism unit so as to carry out a work operation by using a first one of the robot arms of the robot mechanism unit, while shielding the object recognized by the object recognizing unit from entering a working space of the robot mechanism unit by putting a second one of the robot arms in a position between the working space in which the work operation of the first one of the robot arms is carried out and a movement space in which the object recognized by the object recognizing unit moves,
 wherein the control unit controls the robot mechanism unit so as to carry out a shielding operation by changing a distance between the object to be shielded recognized by the object recognizing unit and the second one of the robot arms, in response to a relative positional relationship between the object recognized by the object recognizing unit and the working space of the robot mechanism unit.

2. The robot apparatus according to claim 1, wherein the control unit controls the robot mechanism unit so as to change speed and flexibility of the shielding operation in response to the positional relationship between the object to be shielded recognized by the object recognizing unit and the working space of the robot mechanism unit.

3. The robot apparatus according to claim 2, wherein the control unit controls the robot mechanism unit so as to change a position, speed, and flexibility of the shielding operation in accordance of a degree of danger of the robot work operation.

4. The robot apparatus according to claim 1, further comprising:
 a predicting means for predicting an action of the object recognized by the object recognizing unit,
 wherein based upon a position of the object predicted by the predicting means, the control unit controls the robot mechanism unit so as to change the position, speed, and flexibility of the shielding operation.

5. The robot apparatus according to claim 4, wherein the control unit controls the robot mechanism unit so as to change a position, speed, and flexibility of the shielding operation in accordance of a degree of danger of the robot work operation.

6. A robot apparatus comprising:
 a robot mechanism unit having a plurality of robot arms, a robot main body to which the robot arms are attached, and a moving mechanism for moving the robot main body;

an object recognizing unit for recognizing any one or a plurality of objects among three types of objects including a moving object, an animal, and a person; and a control unit for controlling the robot mechanism unit so as to carry out a work operation by using a first one of the robot arms of the robot mechanism unit, a work operation by using the moving mechanism, or a cooperative work operation between the first one of the robot arms and the moving mechanism, while shielding the object recognized by the object recognizing unit from entering a working space of the robot mechanism unit by putting a second one of the robot arms in a position between the working space in which the operation of the first one of the robot arms is carried out and a movement space in which the recognized object by the object recognizing unit moves.

7. The robot apparatus according to claim 6, wherein the control unit controls the robot mechanism unit so that the shielding operation by the use of the second one of the robot arms is a direction change of the robot mechanism unit carried out by a pivotal mechanism or the moving mechanism.

8. The robot apparatus according to claim 6, wherein the second one of the robot arms carries out a shaking operation for the shielding operation.

9. A robot apparatus comprising:
   a robot mechanism unit having a robot arm and a robot main body to which the robot arm is attached;
   an object recognizing unit for recognizing any one or a plurality of objects among three types of objects including a moving object, an animal, and a person as an object to be shielded: and
   a control unit for controlling the robot mechanism unit so as to carry out a work operation by using the robot arm of the robot mechanism unit, while shielding the object recognized by the object recognizing unit from entering a working space of the robot mechanism unit by putting a trunk portion of the robot main body in a position between the working space in which the robot arm is operated and a movement space in which the recognized object by the object recognizing unit moves, wherein the control unit controls the robot mechanism unit so as to carry out a shielding operation by changing a distance between the object to be shielded recognized by the object recognizing unit and the robot arm, in response to a relative positional relationship between the object recognized by the object recognizing unit and the working space of the robot mechanism unit.

10. A robot apparatus comprising:
   a robot mechanism unit having a robot arm, a robot main body to which the robot arm is attached, and a moving mechanism for moving the robot main body;
   an object recognizing unit for recognizing any one or a plurality of objects among three types of objects including a moving object, an animal, and a person: and
   a control unit for controlling the robot mechanism unit so as to carry out a work operation by using the robot arm of the robot mechanism unit, a work operation by using the moving mechanism, or a cooperative work operation between the robot arm and the moving mechanism, while shielding the object recognized by the object recognizing unit from entering a working space of the robot mechanism unit by putting a trunk portion of the robot main body in a position between the working space in which the robot arm is operated and a movement space in which the recognized object by the object recognizing unit moves.

* * * * *

UNITED STATES PATENT AND TRADEMARK OFFICE
CERTIFICATE OF CORRECTION

| | | |
|---|---|---|
| PATENT NO. | : 7,778,732 B2 | Page 1 of 1 |
| APPLICATION NO. | : 12/356719 | |
| DATED | : August 17, 2010 | |
| INVENTOR(S) | : Yuji Adachi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

This patent is subject to a terminal disclaimer. --

Signed and Sealed this
Eighth Day of March, 2011

David J. Kappos
*Director of the United States Patent and Trademark Office*